US012804596B2

(12) United States Patent
Chong

(10) Patent No.: US 12,804,596 B2
(45) Date of Patent: Nov. 17, 2026

(54) SENSING SERVICE PROCESSING METHOD, TERMINAL, AND NETWORK-SIDE DEVICE

(71) Applicant: VIVO MOBILE COMMUNICATION CO., LTD., Dongguan (CN)

(72) Inventor: Weiwei Chong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 242 days.

(21) Appl. No.: 18/613,726

(22) Filed: Mar. 22, 2024

(65) Prior Publication Data

US 2024/0236935 A1 Jul. 11, 2024

Related U.S. Application Data

(63) Continuation of application No. PCT/CN2022/120532, filed on Sep. 22, 2022.

(30) Foreign Application Priority Data

Sep. 24, 2021 (CN) ........................ 202111124351.X

(51) Int. Cl.
*H04W 4/38* (2018.01)
*H04W 64/00* (2009.01)

(52) U.S. Cl.
CPC ................................ *H04W 64/006* (2013.01)

(58) Field of Classification Search
CPC ..... H04W 64/006; H04W 76/14; H04W 4/02; H04W 4/021; H04W 24/02; H04W 4/38
USPC ...................................................... 455/456.2
See application file for complete search history.

(56) References Cited

U.S. PATENT DOCUMENTS

| | | | |
|---|---|---|---|
| 9,344,969 B2 * | 5/2016 | Marks ............... H04W 52/0241 |
| 10,154,048 B2 | 12/2018 | Krishnamurthi et al. |
| 11,222,543 B2 | 1/2022 | Merfels et al. |
| 2011/0143779 A1 | 6/2011 | Rowe et al. |
| 2017/0272450 A1 * | 9/2017 | Krishnamurthi ........ G06F 21/35 |
| 2021/0076161 A1 | 3/2021 | Sion |
| 2021/0297826 A1 | 9/2021 | Volkerink et al. |

FOREIGN PATENT DOCUMENTS

| | | |
|---|---|---|
| CN | 103546888 A | 1/2014 |
| CN | 108780478 A | 11/2018 |
| CN | 112042169 A | 12/2020 |
| CN | 113873462 A | 12/2021 |

OTHER PUBLICATIONS

Polaris Wireless, "Sensor Provide Location Information Elements Correction", 3GPP TSG-RAN2 Meeting #109 electronic, Elbonia, Feb. 24-Mar. 6, 2020, R2-2001940.

Vivo et al., "Introduction of network based Sensing in 5G Advanced", Jul. 30, 2021.

Vivo, "Network based Sensing in R18", Sep. 8, 2021.

* cited by examiner

*Primary Examiner* — Tanmay K Shah
(74) *Attorney, Agent, or Firm* — The Webb Law Firm

(57) ABSTRACT

A sensing service processing method includes a first network element receives a first sensing service request message, where the first sensing service request message is used for requesting for performing sensing for a service for a first user equipment. The first network element selects a target sensing control function network element and/or a target sensing device according to location information of the first user equipment.

18 Claims, 11 Drawing Sheets

SENSING SERVICE PROCESSING METHOD, TERMINAL, AND NETWORK-SIDE DEVICE

CROSS-REFERENCE TO RELATED APPLICATIONS

This application is a Bypass Continuation Application of International Patent Application No. PCT/CN2022/120532 filed Sep. 22, 2022, and claims priority to Chinese Patent Application No. 202111124351.X filed Sep. 24, 2021, the disclosures of which are hereby incorporated by reference in their entireties.

BACKGROUND OF THE INVENTION

Field of the Invention

This application belongs to the technical field of communications, and in particular to a sensing service processing method, a terminal, and a network-side device.

Description of Related Art

The 5th generation (5G) or the 6th generation (6G) wireless communication network not only provides a function of data communication transmission, but also provides a function of sensing.

SUMMARY OF THE INVENTION

According to a first aspect, a sensing service processing method is provided. The method is applied to a first network element and includes:

- receiving, by a first network element, a first sensing service request message, where the first sensing service request message is used for requesting for performing sensing for a service for a first user equipment; and
- selecting, by the first network element, a target sensing control function network element and/or a target sensing device according to location information of the first user equipment.

According to a second aspect, a sensing service processing method is provided. The method is applied to a sensing control function network element and includes:

- receiving, by a sensing control function network element, a third sensing service request message transmitted by a first network element; and
- selecting, by the sensing control function network element, a target sensing device according to the third sensing service request message.

The third sensing service request message includes at least one of the following:

- second sensing service description information;
- information of a first area; or
- identification information of a candidate sensing device in the first area.

According to a third aspect, a sensing service processing method is provided. The method is applied to a sensing control function network element and includes:

- receiving, by a sensing control function network element, a second sensing service request message.

The second sensing service request message includes: second sensing service description information and identification information of a target sensing device.

According to a fourth aspect, a sensing service processing method is provided. The method is applied to a sensing control function network element and includes:

- receiving, by a sensing control function network element, a first sensing service request message, where the first sensing service request message is used for requesting for performing sensing for a service for a first user equipment;
- transmitting, by the sensing control function network element, a first request message to a first network element, where the first request message is used for requesting to acquire identification information of a sensing device in a sensing serving area corresponding to the first user equipment;
- receiving, by the sensing control function network element, a first request response message transmitted by the first network element, and acquiring identification information of a candidate sensing device in the sensing serving area corresponding to the first user equipment; and
- selecting, by the sensing control function network element, a target sensing device for the sensing service according to the identification information of the candidate sensing device.

According to a fifth aspect, a sensing service processing method is provided. The method is applied to a first network element and includes:

- receiving, by a first network element, a first request message, where the first request message is used for requesting to acquire identification information of a sensing device in a sensing serving area corresponding to a first user equipment;
- determining, by the first network element, information of a first area according to location information of the first user equipment, and acquiring identification information of a candidate sensing device in the first area; and
- transmitting, by the first network element, a first request response message, where the first request response message carries the identification information of the candidate sensing device in the first area.

According to a sixth aspect, a sensing service processing method is provided. The method is applied to a sensing device and includes:

- reporting, by a sensing device, service sensing capability information to a first network element.

The service sensing capability information includes at least one of the following:

- information indicating whether sensing service is supported or not;
- supported sensing service type information;
- supported sensing object information;
- supported sensing measurement range information;
- supported sensing measurement type information;
- supported quality of service QoS information of sensing service;
- supported sensing measurement service purpose or application information;
- supported sensing measurement time information; or
- supported sensing data reporting information.

According to a seventh aspect, a sensing service processing apparatus is provided. The apparatus includes:

- a first receiving unit, configured to receive a first sensing service request message, where the first sensing service request message is used for requesting for performing sensing for a service for a first user equipment; and
- a first selection unit, configured to select a target sensing control function network element and/or a target sensing device according to location information of the first user equipment.

According to an eighth aspect, a sensing service processing apparatus is provided. The apparatus includes:

a second receiving unit, configured to receive a third sensing service request message transmitted by a first network element; and a third selection unit, configured to select a target sensing device according to the third sensing service request message.

The third sensing service request message includes at least one of the following:

second sensing service description information;

information of a first area; or identification information of a candidate sensing device in the first area.

According to a ninth aspect, a sensing service processing apparatus is provided. The apparatus includes:

a third receiving unit, configured to receive a second sensing service request message.

The second sensing service request message includes: second sensing service description information and identification information of a target sensing device.

According to a tenth aspect, a sensing service processing apparatus is provided. The apparatus includes:

a fourth receiving unit, configured to receive a first sensing service request message, where the first sensing service request message is used for requesting for performing sensing for a service for a first user equipment;

a third transmitting unit, configured to transmit a first request message to a first network element, where the first request message is used for requesting to acquire identification information of a sensing device in a sensing serving area corresponding to the first user equipment;

a fifth receiving unit, configured to receive a first request response message transmitted by the first network element, and acquire identification information of a candidate sensing device in the sensing serving area corresponding to the first user equipment; and a sixth selection unit, configured to select a target sensing device for the sensing service according to the identification information of the candidate sensing device.

According to an eleventh aspect, a sensing service processing apparatus is provided. The apparatus includes:

a sixth receiving unit, configured to receive a first request message, where the first request message is used for requesting to acquire identification information of a sensing device in a sensing serving area corresponding to a first user equipment;

a fourth acquisition unit, configured to determine information of a first area according to location information of the first user equipment, and acquire identification information of a candidate sensing device in the first area; and a fourth transmitting unit, configured to transmit a first request response message, where the first request response message carries the identification information of the candidate sensing device in the first area.

According to a twelfth aspect, a sensing service processing apparatus is provided. The apparatus includes:

a first report unit, configured to report service sensing capability information to a first network element.

The service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

According to a thirteenth aspect, a terminal is provided. The terminal includes a processor, a memory, and a program or instruction stored in the memory and executable on the processor. The program or instruction, when executed by the processor, implements steps of the sensing service processing method according to the sixth aspect.

According to a fourteenth aspect, a terminal is provided. The terminal includes a processor and a communication interface. The communication interface is configured to report service sensing capability information to a first network element.

According to a fifteenth aspect, a network-side device is provided. The network-side device includes a processor, a memory, and a program or instruction stored in the memory and executable on the processor. The program or instruction, when executed by the processor, implements steps of the sensing service processing method according to the first aspect, implements steps of the sensing service processing method according to the second aspect, implements steps of the sensing service processing method according to the third aspect, implements steps of the sensing service processing method according to the fourth aspect, implements steps of the sensing service processing method according to the fifth aspect, or implements steps of the sensing service processing method according to the sixth aspect.

According to a sixteenth aspect, a network-side device is provided, including a processor and a communication interface. The communication interface is configured to receive a first sensing service request message. The first sensing service request message is used for requesting for performing sensing for a service for a first user equipment. The processor is configured to select a target sensing control function network element and/or a target sensing device according to location information of the first user equipment.

Or, the communication interface is configured to receive a first request message. The first request message is used for requesting to acquire identification information of a sensing device in a sensing serving area corresponding to a first user equipment. The processor is configured to determine information of a first area according to location information of the first user equipment, and acquire identification information of a candidate sensing device in the first area. The communication interface is further configured to transmit a first request response message. The first request response message carries the identification information of the candidate sensing device in the first area.

Or, the communication interface is configured to receive a third sensing service request message transmitted by a first network element. The processor is configured to select a target sensing device according to the third sensing service request message. The third sensing service request message includes at least one of the following: second sensing service description information; information of a first area; or identification information of a candidate sensing device in the first area.

Or, the communication interface is configured to receive a second sensing service request message. The second sensing service request message includes: second sensing service description information and identification information of a target sensing device.

Or, the communication interface is configured to receive a first sensing service request message. The first sensing service request message is used for requesting for performing sensing for a service for a first user equipment. The communication interface is further configured to transmit a first request message to a first network element. The first request message is used for requesting to acquire identification information of a sensing device in a sensing serving area corresponding to the first user equipment. The communication interface is further configured to receive a first request response message transmitted by the first network element, and acquire identification information of a candidate sensing device in the sensing serving area corresponding to the first user equipment. The processor is configured to select a target sensing device for the sensing service according to the identification information of the candidate sensing device.

According to a seventeenth aspect, a non-transitory readable storage medium is provided. The non-transitory readable storage medium stores a program or instruction. The program or instruction, when executed by a processor, implements steps of the sensing service processing method according to the first aspect, implements steps of the sensing service processing method according to the second aspect, implements steps of the sensing service processing method according to the third aspect, implements steps of the sensing service processing method according to the fourth aspect, implements steps of the sensing service processing method according to the fifth aspect, or implements steps of the sensing service processing method according to the sixth aspect.

According to an eighteenth aspect, a chip is provided. The chip includes a processor and a communication interface. The communication interface is coupled to the processor. The processor is configured to execute a program or instruction to implement the sensing service processing method according to the first aspect, implement the sensing service processing method according to the second aspect, implement the sensing service processing method according to the third aspect, implement the sensing service processing method according to the fourth aspect, implement the sensing service processing method according to the fifth aspect, or implement the sensing service processing method according to the sixth aspect.

According to a nineteenth aspect, a computer program/program product is provided. The computer program/program product is stored in a non-volatile storage medium. The program/program product is executed by at least one processor to implement the sensing service processing method according to the first aspect, implement the sensing service processing method according to the second aspect, implement the sensing service processing method according to the third aspect, implement the sensing service processing method according to the fourth aspect, implement the sensing service processing method according to the fifth aspect, or implement the sensing service processing method according to the sixth aspect.

DESCRIPTION OF THE INVENTION

The technical solutions in embodiments of this application are clearly and completely described in the following with reference to the accompanying drawings in embodiments of this application. Apparently, the described embodiments are merely some rather than all of the embodiments of this application. All other embodiments obtained by those skilled in the art based on embodiments of this application fall within the protection range of this application.

The terms "first", "second", and the like in the specification and claims of this application are used to distinguish similar objects and are not used to describe a particular order or priority. It should be understood that the terms so used are interchangeable where appropriate, whereby embodiments of this application can be practiced in an order other than those illustrated or described herein, and that the objects distinguished by "first" and "second" are generally one class and the number of objects is not limited. For example, there may be one or more first objects. Furthermore, "and/or" in the specification and claims represents at least one of the connected objects, and the character "/" generally represents that the associated objects are in an "or" relationship.

The steps of embodiments of the present application are schematic of the principle of the method, which does not mean that all the steps are required to be executed, and some steps may be optional steps.

It is to be noted that the technologies described in embodiments of this application are not limited to a long term evolution (LTE)/LTE-advanced (LTE-A) system, and may further be applied to various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in embodiments of this application are often used interchangeably, and the described techniques may be used for both the above-mentioned systems and radio technologies and for other systems and radio technologies. The following description describes a new radio (NR) system for example purposes and uses the NR term in most of the following descriptions, but these technologies may also be applied to applications other than NR system applications, such as 6th generation (6G) communication systems.

Figure 1:
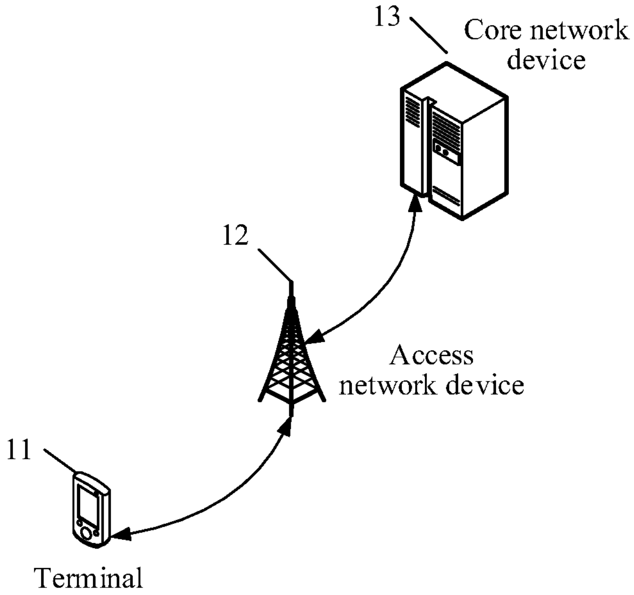
FIG. 1 is a block diagram of a wireless communication system to which an embodiment of this application is applicable.
Figure 2:
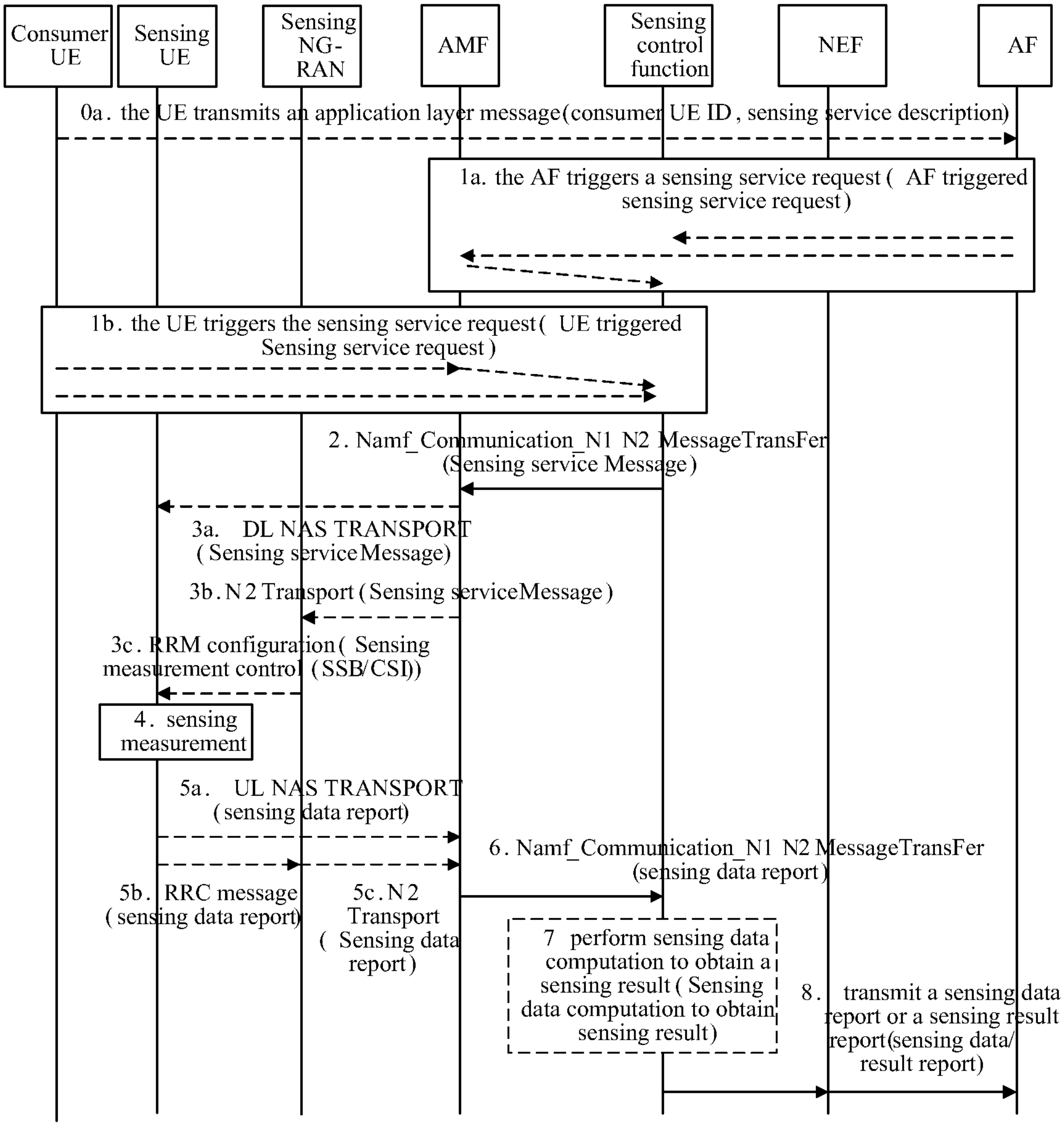
FIG. 2 is a schematic diagram of a sensing service process.

FIG. 1 shows a block diagram of a wireless communication system to which an embodiment of this application is applicable. The wireless communication system includes a terminal 11, an access network device 12, and a core network device 13. The terminal 11 may also be referred to as a terminal device or user equipment (UE), and the terminal 11 may be other terminal-side devices, such as a mobile phone, a tablet personal computer, a laptop computer or a notebook computer, a palmtop computer, a netbook, an ultra-mobile personal computer UMPC), a mobile Internet device (MID), a wearable device or a vehicle user equipment (VUE), and a pedestrian user equipment (PUE). The wearable device includes: smart watches, bracelets, headphones, glasses, and the like. It should be noted that the specific type of the terminal 11 is not limited in this embodiment of this application. The access network device 12 may also be referred to as a radio access network device or a radio access network (RAN). The access network device 12 may be a base station. The base station may be referred to as a node B, an evolved node B, an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a WiFi node, a transmitting receiving point (Transmitting Receiving Point, TRP), or some other suitable terms in the art, provided that the same technical effect is achieved, the base station is not limited to specific technical vocabulary. It should be noted that in this embodiment of this application, only the base station in the NR system is taken as an example, but the specific type of the base station is not limited. The core network device 13 may also be referred to as a core network (CN) or a 5G core (5GC) network. The core network device 13 may include, but is not limited to, at least one of the following: a core network node, a core network function, a mobility management entity (MME), an access and mobility management function (AMF), a session management function (SMF), a user plane function (UPF), a policy control function (PCF), a policy and charging rules function unit (PCRF), an edge application server discovery function (EASDF), an application function (AF), or the like. It should be noted that in this embodiment of this application, only the core network device in the 5G system is taken as an example, but this application is not limited thereto. FIG. 2 is a schematic diagram of a sensing service process. As shown in FIG. 2, the sensing service process includes the following steps:

Step 0*a*: A service object (Consumer UE) transmits an application layer message to an AF, where the application layer message carries an ID of the service object and sensing service description information.

Step 1*a*: The AF triggers a sensing service request (There are two modes. In the first mode, the AF transmits a sensing service request message to a sensing control function (SCF) network element. In the second mode, the AF first transmits a sensing service request message to an AMF network element and then the AMF network element forwards the sensing service request message to the SCF network element). Or, Step 1*b*: The Consumer UE triggers the sensing service request (There are two implementation modes. In the first implementation mode, the Consumer UE directly transmits the sensing service request message to the SCF network element. In the second implementation mode, the Consumer UE first transmits the sensing service request message to the AMF network element, and then the AMF network element forwards the sensing service request message to the SCF network element).

It should be noted that step 1*a* and step 1*b* may both be an alternative relationship.

Step 2: The SCF network element transmits Namf_Communication_N1 N2 Message Transfer (sensing service message) to the AMF network element.

Step 3: The AMF network element transmits the sensing service message to a sensing UE.

The following three modes are included.

3*a*: DL NAS TRANSPORT (Sensing service Message).

3*b*: N2 TRANSPORT (Sensing service Message).

3*c*: RRM configuration (sensing measurement control SSB/CSI).

Step 4: The sensing UE performs sensing measurement.

Step 5: The sensing UE reports a measurement result.

5*a*: The sensing UE transmits a UL NAS TRANSPORT message (carrying a sensing data report) to the AMF network element.

Or,

5*b*: The sensing UE transmits an RRC message (carrying a sensing data report) to a Sensing NG-RAN.

5*c*: The Sensing NG-RAN transmits an N2 TRANSPORT message (carrying a sensing data report) to the AMF network element.

The sensing data report is generated according to a measurement result.

Step 6: The AMF network element transmits the sensing data report to the SCF network element through Namf_Communication_N1 N2 Message Transfer.

Step 7: The SCF network element calculates sensing data according to the sensing data report and obtains a sensing result.

Step 8: The SCF network element transmits the sensing data report or a sensing result report to the AF.

As can be seen from the above, FIG. 2 shows an overall sensing service process, but the following problems still exist in the sensing service scenario for a user granularity (a certain or a group of consumer UE):

Problem 1: Which network element (AMF or SCF) processes a sensing service request?

Problem 2: How to select a sensing control function network element or a sensing device for a sensing service of a mobile service object (mobile consumer UE)?

A sensing service processing method, a terminal, and a network-side device provided by embodiments of this application are described below in detail through some embodiments and application scenarios thereof with reference to the drawings.

Figure 3:
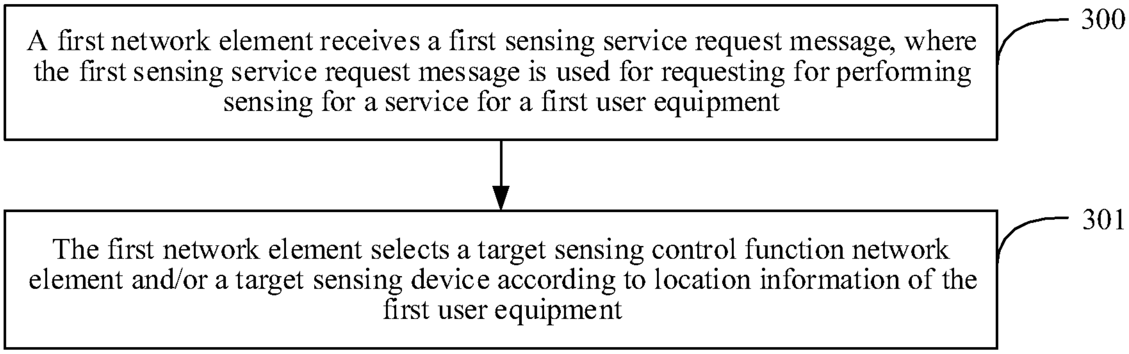
FIG. 3 is a first schematic flowchart of a sensing service processing method according to an embodiment of this application.

FIG. 3 is a first schematic flowchart of a sensing service processing method according to an embodiment of this application. As shown in FIG. 3, an execution entity of the method is a first network element.

Optionally, the first network element involved in this embodiment of this application may be an access and mobility management function AMF network element or a sensing control function SCF network element.

It should be noted that the names of network elements involved in all embodiments of this application are merely illustrative and may be replaced by other names provided that similar functions are provided. For example, an SCF may be replaced by an SF (sensing function). In the following embodiments, a first network element is described as an AMF network element or an SCF network element, which is not limited to this application.

The method includes the following steps:

Step 300: A first network element receives a first sensing service request message, where the first sensing service request message is used for requesting for performing sensing for a service for a first user equipment.

The first user equipment UE may be an Internet of Things device, or a device used by a user, or the device used by the user refers to the user.

The sensing service is carried out for the first user equipment UE, which has the following meanings:

That is, a service object of the sensing service is the first UE, and the sensing service process is used for sensing and measuring one or more measurement quantities. The measurement quantity is associated with the first UE. This application has, but not limited to, the following situations:

The first UE may be a sensing signal measurer, which receives a signal transmitted by a peripheral. The first UE measures the measurement quantity. Or, the first UE may transmit a sensing signal, whereby the peripheral measures the sensing signal to obtain the measurement quantity.

Sensing signals are transmitted, received, and measured between other peripherals of the first UE, so as to evaluate the influence of signals passing through a surrounding environment of the first UE and acquire the measurement quantity associated with the first UE.

For example, the first UE refers to the user, and transmits a sensing physical signal using a transmitting device around the user. The physical signal passes through the environment around the user and is affected by the breathing of the user and reaches a signal receiving device. The signal receiving device performs analysis and measurement to acquire the measurement quantity of the sensing signal affected by the breathing of the user.

Step 301: The first network element selects a target sensing control function network element and/or a target sensing device according to location information of the first user equipment.

The target sensing control function network element includes a selected SCF network element. The target sensing device includes a selected sensing terminal device and/or sensing access network device.

The SCF network element may include at least one of the following functions:

- negotiating a sensing resource configuration with a sensing device (typically a signal transmitting device) such that the sensing device transmits a sensing physical signal according to configuration information or determines how the sensing device transmits the sensing physical signal;
- controlling the sensing device (typically a signal receiving device) to perform sensing measurement for a certain sensing service; or
- acquiring sensing measurement type information, and performing data analysis or data processing.

In this embodiment of this application, the sensing device includes a sensing terminal device (Sensing UE) and/or a sensing access network device (Sensing RAN).

The sensing device may include at least one of the following functions:

- negotiating a sensing resource configuration with the SCF network element;
- performing sensing measurement for a certain sensing service; or
- reporting a sensing measurement result (measurement value).

Optionally, the first network element determines location information of the first user equipment in response to the first sensing service request message, and selects a target sensing control function network element and/or a target sensing device according to the location information of the first user equipment and the first sensing service request message.

In this embodiment of this application, a first network element processes a sensing service request message, and the first network element selects a suitable sensing control function network element and/or sensing device for a sensing service of a first user equipment according to location information of the first user equipment, so as to ensure the smooth progress of a sensing service process based on a user granularity.

Optionally, the first sensing service request message is transmitted by the AF, or by the first user equipment, or by the AF through a network exposure function (NEF) network element.

In one implementation, before step 300, the method further includes the following steps:

Step 0: The consumer UE may interact with the AF in an application layer for sensing task information, where the sensing task information includes identification information of the consumer UE (such as a consumer UE ID or a Consumer UE IP address) and third sensing service description information.

Thus, the AF may determine that the consumer UE requests to execute a sensing service corresponding to the third sensing service description information.

Step 1*a*: The AF transmits a first sensing service request message to the first network element through the NEF network element.

If the AF belongs to an operator trusted AF, step 1*a* does not need to be performed by the NEF network element.

Step 1*b*: Optionally, the consumer UE may also directly transmit the first sensing service request message to the first network element.

In one implementation, the consumer UE may use an NAS message to transmit the first sensing service request message to the first network element.

Optionally, the first sensing service request message includes identification information of the first user equipment and first sensing service description information.

The first sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

It will be understood that the first sensing service request message carries the identification information of the first user equipment and the first sensing service description information.

Optionally, the first sensing service description information is the same or different from the third sensing service description information. In a case that the two pieces of information are different, the AF actually extracts or generates the first sensing service description information according to the third sensing service description information.

The identification information of the first user equipment refers to identification information of a service object of a sensing service, such as the consumer UE ID or the Consumer UE IP address, which is used for indicating a user equipment identifier triggering the sensing service, or explaining a user identifier corresponding to the service object of the sensing service.

The sensing service type information is used for defining a sensing service type, which may be defined according to a sensing physical range and real-time requirements, such as Type I: Large sensing range and high real-time requirement (e.g., Delay Critical Large Scale Service (LSS)); Type II: Large sensing range and low real-time requirement (e.g., LSS); Type III: Small sensing range and high real-time requirement (e.g., Delay Critical Small Scale Service (SSS)); Type IV: Small sensing range and low real-time requirement (e.g., SSS).

The sensing object information includes, but is not limited to, at least one of objects, equipment, people, animals, buildings, cars, environment, air quality, humidity, temperature, or a specific area (namely, a certain area).

The measurement type information is used for indicating which types of measurement quantities of a sensing object are measured, including but not limited to: at least one of a location of the sensing object, a distance of the sensing object, a moving speed of the sensing object, imaging of the sensing object, a motion trajectory of the sensing object, texture analysis and material analysis of the sensing object, a shape of the sensing object, or a heartbeat of the sensing object.

The sensing service purpose or application information corresponds to second and third columns of Table 1 respectively.

TABLE 1

Wireless sensing service purpose and application

| Wireless sensing category | Sensing service purpose | Application |
|---|---|---|
| Large-scale macroscopic sensing category | Weather, air quality, etc. | Meteorological, agricultural, and living services |
| | Traffic flow (intersection) and people flow (subway entrance) | Smart city, intelligent transportation, and business services |
| | Animal activities, migration, etc. | Animal husbandry, ecological environment protection, etc. |
| | Target tracking, ranging, velocity measurement, contour, etc. | Many application scenarios of traditional radar |
| | Three-dimensional mapping | Intelligent driving, navigation, and smart city |
| Close-range refined sensing category | Action posture recognition | Smart interaction, games and smart home of smartphones |
| | Heartbeat/breathing, etc. | Health and medical care |
| | Imaging, material detection, etc. | Security check, industry, etc. |

The sensing service granularity information includes, but is not limited to, a user granularity per UE or a user group granularity per UE Group. For example, the granularity information of the sensing service is the user granularity in this embodiment.

The sensing service time information may be used for defining time information about execution of a sensing service, which may be absolute time information (for example, Monday, 13:00-19:00) or relative time information (for example, within the next month). The time information may include a start time, an end time, a duration, or the like.

The sensing data reporting information is used for defining a reporting condition, a reporting time, a reporting format, and a reporting count of sensing data.

The reporting condition may be event triggering or periodic triggering. If the reporting condition is event triggering, the reporting condition further includes event description information (for example, determining that a user enters a driving state). If the reporting condition is periodic triggering, the reporting condition further includes reporting period information (for example, every 5 minutes). The reporting time is used for indicating a time range needed to report sensing measurement data, and the reporting time may be consistent or inconsistent with the foregoing sensing service time. In addition, the reporting format is used for indicating a form in which the sensing data is reported, for example, indicating reporting in a binary/text form. The reporting count is used for indicating whether the reporting is performed once or repeatedly, and indicating a count of repeated reporting.

The sensing service quality of service (QoS) requirement information includes, but is not limited to, at least one of a sensing accuracy, a sensing error, a sensing range, a sensing delay, a detection probability, or a false alarm probability. The sensing accuracy includes: a range resolution, an imaging resolution, a moving speed resolution, or an angle resolution. The sensing error includes: a range error, an imaging error, or a moving speed error.

In some optional embodiments, the first sensing service request message further includes: first sensing serving area information, where the first sensing serving area information includes absolute location range information or relative location range information corresponding to the first user equipment.

It should be noted that the first sensing serving area information is used for indicating a location range or location granularity of the sensing service for the service object of the sensing service.

The first sensing serving area information may be absolute location range information corresponding to the first user equipment. For example, the first sensing serving area information includes TAI(s), cell ID(s), and/or an area ID (such as Tiananmen Square, Beijing) corresponding to the first user equipment.

For example, when the granularity of a sensing service is TAI(s), it means that the sensing service is carried out within a range indicated by TAI(s). When the granularity of a sensing service is an area ID, it means that the sensing service is carried out within a range indicated by the area ID. In the presence of a plurality of pieces of information, a range indicated by the plurality of pieces of information may or may not be consistent. If no, it means that the sensing service is carried out within a union range of the ranges indicated by the plurality of pieces of information.

The first sensing serving area information may be relative location range information corresponding to the first user equipment. For example, the location of the first user equipment is within 20 meters around.

Optionally, the first sensing service request message carries the first sensing serving area information, indicating that the first sensing serving area information is designated by the AF or the first user equipment.

In some optional embodiments, the method further includes:

The first network element reselects the target sensing control function network element and/or the target sensing device according to an update of the location information of the first user equipment.

The location of the first user equipment may change continuously due to the movement thereof. Therefore, the first network element needs to track the location of the first user equipment all the time and reselect the target sensing control function network element and/or the target sensing device according to the update of the location information of the first user equipment.

Optionally, the first network element may subscribe the location information of the first user equipment to an RAN or to an LMF for tracking the location of the first user equipment.

For example, the AMF subscribes the location information of the consumer UE to the RAN or to the LMF for tracking the location of the consumer UE.

Figure 4:
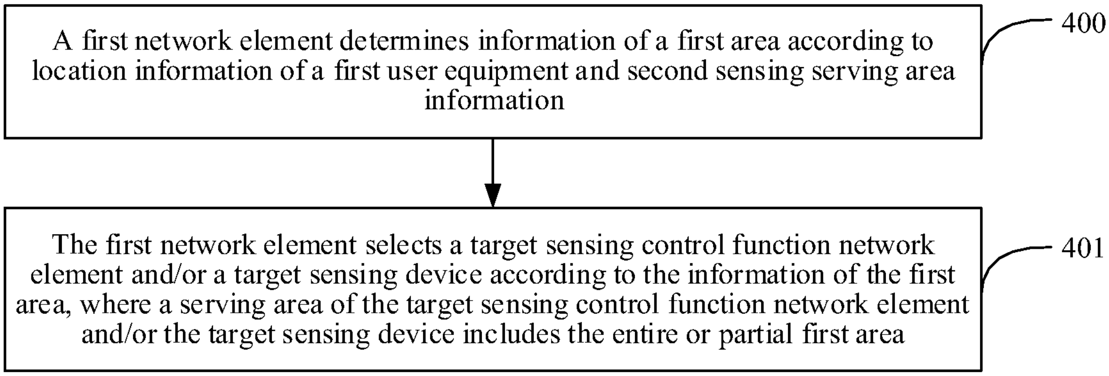
FIG. 4 is a schematic flowchart of selecting a target sensing control function network element and/or a target sensing device according to location information of a first user equipment according to an embodiment of this application.

In some optional embodiments, as shown in FIG. 4, the first network element selects a target sensing control function network element and/or a target sensing device according to location information of the first user equipment, including:

Step 400: The first network element determines information of a first area according to the location information of the first user equipment and second sensing serving area information.

The second sensing serving area information includes relative location range information or absolute location range information associated with the first user equipment.

Optionally, the second sensing serving area information may be the first sensing serving area information, namely, relative location range information or absolute location range information associated with the first user equipment designated by the AF or the first user equipment. Or, the second sensing serving area information is generated according to the first sensing serving area information.

Optionally, the second sensing serving area information may also be default relative location range information or absolute location range information locally configured by the first network element.

Optionally, the location information of the first user equipment may be a TA, cell or another type of location of the first user equipment in the network.

Optionally, the first network element may also acquire the location information (such as GPS location information and grid location information) of the first user equipment from the LMF by using a network location service.

The first area refers to an area of interest (AOI).

The first network element determines information of a first area according to the location information of the first user equipment and second sensing serving area information by the following two implementation modes:

Mode 1: The first network element determines the AOI according to the location information of the first user equipment and the relative location range information or the absolute location range information locally configured by the first network element.

Mode 2: The first network element determines the AOI according to the location information of the first user equipment and the relative location range information or the absolute location range information associated with the first user equipment designated by the AF or the first user equipment.

Step 401: The first network element selects the target sensing control function network element and/or the target sensing device according to the information of the first area, where a serving area of the target sensing control function network element and/or the target sensing device includes the entire or partial first area.

The first network element needs to determine one or more target sensing control function network elements capable of serving the AOI and/or the target sensing device to carry out the sensing service.

The first network element determines whether the sensing control function network element and/or the sensing device can serve the AOI according to whether a serving area of the sensing control function network element and/or the sensing device includes the entire or partial AOI.

For example, if a serving area of an SCF includes an entire AOI, the SCF may serve the AOI, and the SCF may be used as a target sensing control function network element. If a serving area of an SCF includes a partial AOI, the SCF may serve the partial AOI (other parts of the AOI may be served by other SCFs), and the one or more SCFs may be used as target sensing control function network elements.

Optionally, the first network element further needs to select one or more sensing control function network elements and/or sensing devices that can satisfy, according to at least one information in the first sensing service request message, the information.

For example, the AMF further needs to select one or more SCFs satisfying the information based on at least one of the following information in the first sensing service request message:

- sensing service type information, where the SCF may, for example, provide a sensing control service corresponding to the sensing service type;
- sensing object information, where the SCF may, for example, serve the sensing object;
- sensing measurement type information, where the SCF may, for example, provide a sensing control service corresponding to the sensing measurement type;
- sensing service purpose or application information, where a sensing service provided by the SCF supports, for example, the purpose or application for the sensing service;
- sensing service granularity information, where the SCF may, for example, provide a sensing control service corresponding to the granularity;
- sensing service time information, where the SCF may, for example, provide a sensing control service for the sensing service time;
- sensing data reporting information, where the SCF, for example, supports reporting rules specified in the sensing data reporting information; or
- sensing service quality of service (QoS) requirement information, where a sensing service provided by the SCF enables, for example, the sensing service to meet the QoS requirement.

It should be noted that service sensing attribute and capability information of the SCF network element may be characterized by at least one of the following: supported sensing measurement range information, supported sensing service type information, supported sensing object information, supported sensing measurement type information, supported sensing service purpose or application information, supported sensing service time information, supported sensing data reporting information, or supported sensing service quality of service (QoS) information.

It should be noted that the service sensing attribute and capability information is equivalent to the service sensing capability information in this application.

The first network element selects a sensing control function network element and/or a sensing device with reference to at least one information in the first sensing service request message by the following two implementations:

In one implementation, the first network element locally stores attribute and capability information of the sensing control function network element and/or the sensing device (for example, the sensing measurement range supported by the SCF, the sensing service type supported by the SCF, the sensing service Qos level supported by the SCF, and the like). Then the first network element selects the target sensing control function network element and/or the target sensing device according to the attribute and capability information of the sensing control function network element and/or the sensing device.

Optionally, the method further includes:

The first network element acquires service sensing capability information of a sensing control function network element and/or a sensing device in a network.

Optionally, the network herein may be the serving area of the first network element in the network or in the second sensing serving area or in the first area.

In the other implementation, the first network element selects the target sensing control function network element and/or the target sensing device according to the information of the first area, including:

The first network element queries the target sensing control function network clement and/or the target sensing device from a network repository function network element according to the information of the first area.

Optionally, the network repository function network element is an NRF network element. It should be noted that the NRF network element may also be replaced by other network elements with repository functions such as unified data management (UDM) and unified data repository (UDR). The NRF network element will be described below, which is not limited to this application.

A query request transmitted by the first network element to the NRF carries corresponding query conditions. The query conditions may include at least one of the following: the information of the first area, or the service sensing attribute and capability information.

The service sensing attribute and capability information may be generated according to the sensing service description information.

It should be noted that the service sensing attribute and capability information is equivalent to the service sensing capability information in this application.

That is, the NRF returns the target sensing control function network element and/or the target sensing device to the first network element according to the query request. For example, the query conditions carry AOI and service sensing QoS capability information, and the NRF returns the target sensing control function network element and/or the target sensing device satisfying the query conditions. It should be noted that this mode is suitable for the sensing control function network clement and/or the sensing device registering own service sensing capability information in the NRF in advance.

Optionally, the first network element selects the target sensing control function network element and/or the target sensing device according to the information of the first area, including:

The first network element selects a sensing control network element with a sensing service capability matching the sensing service in the first area as the target sensing control function network element according to the service sensing capability information of the sensing control function network element in the network and the first sensing service description information. And/or, The first network element selects a sensing device with a sensing service capability matching the sensing service in the first area as the target sensing device according to the service sensing capability information of the sensing device in the network and the first sensing service description information.

It will be understood that the target sensing control function network element and/or the target sensing device have a sensing service capability matched with the sensing service, thereby ensuring the smooth progress of the sensing service process.

The sensing service capability matched with the sensing service refers to a capability of meeting the requirements of the sensing service, that is, a capability of executing the sensing service described by the first sensing service description information.

Optionally, the first network element selects the sensing control function network element/sensing device in the first area which can satisfy the sensing service corresponding to the first sensing service description information according to the service sensing capability information of the sensing control function network element/sensing device in the network.

Optionally, the first network element determines the service sensing capability information of the sensing control function network element/sensing device in the first area according to the service sensing capability information of the sensing control function network element/sensing device in the network, and selects the sensing control function network element/sensing device with the sensing service capability matched with the sensing service corresponding to the first sensing service description information.

Optionally, if the information of the first area changes, the first network element needs to reselect a sensing control function network element/sensing device in a new first area that can satisfy the sensing service corresponding to the first sensing service description information as the target sensing control function network element/sensing device.

Optionally, since a sensing terminal device (sensing UE) in the first area may leave the first area due to own movement, the first network element needs to continuously track and match the sensing terminal device (sensing UE) matched with the sensing service in the first area.

Optionally, the service sensing capability information includes at least one of the following:

- information indicating whether sensing service is supported or not, for example, supported or not supported;
- supported sensing service type information, for example, type I, type II, and the like;
- supported sensing object information, for example, air, buildings, human bodies, or the like;
- supported sensing measurement range information, for example, absolute range (such as TA list or cell ID list) or relative range (100 meters around sensing UE);
- supported sensing measurement type information, for example, the shape of the sensing object, the heartbeat of the sensing object, the speed of the sensing object, and the like;
- supported sensing service quality of service (QoS) information, where the sensing QoS includes, for example but is not limited to, at least one of a sensing accuracy, a sensing error, a sensing range, a sensing delay, a detection probability, or a false alarm probability, the sensing accuracy includes: a range resolution, an imaging resolution, a moving speed resolution, or an angle resolution, and the sensing error includes: a range error, an imaging error, or a moving speed error;
- supported sensing measurement service purpose or application information, for example, air quality detection, intelligent transportation, and the like;
- supported sensing measurement time information, for example, 07:00 to 10:00 every day available and 22:00 to 24:00 every Monday unavailable; and
- supported sensing data reporting information, for example, supported periodic reporting and/or event-triggered reporting, and supported data reporting formats.

In some optional embodiments, the method further includes:

The first network element transmits a second sensing service request message to the target sensing control function network element in a case that the first network element selects the target sensing device.

The second sensing service request message includes: second sensing service description information and identification information of the target sensing device, where the second sensing service description information is generated according to the first sensing service description information.

It will be understood that the second sensing service request message is used for requesting the target sensing control function network element to transmit sensing resource configuration information, a sensing measurement task, and sensing measurement control information to the target sensing device, thereby ensuring the smooth progress of the sensing service process.

The second sensing service description information in the second sensing service request message is generated according to the first sensing service description information and may be the same as or different from the first sensing service description information. The second sensing service description information may be understood with reference to the first sensing service description information.

In this embodiment, the first network element is an AMF. The AMF selects a suitable target SCF network element for the sensing service of the first user equipment, selects a suitable target sensing device, and transmits identification information of the target sensing device to the target SCF network element, whereby the target SCF network element transmits sensing resource configuration information, a sensing measurement task, and sensing measurement control information to the target sensing device.

Optionally, since the sensing terminal device (sensing UE) in the first area may leave the first area due to own movement, the first network element needs to continuously track and match the sensing terminal device (sensing UE) matched with the sensing service in the first area, determine a new target sensing terminal device, and transmit identification information of the new target sensing terminal device to a target SCF network element, whereby the target SCF network element transmits the sensing resource configuration information, the sensing measurement task, and the sensing measurement control information to the new target sensing device, thereby ensuring the smooth progress of the sensing service process.

Optionally, on the basis of the embodiment shown in FIG. 4, the method further includes:

The first network element transmits a third sensing service request message to the target sensing control function network element in a case that the first network element does not select the target sensing device.

The third sensing service request message includes at least one of the following:

- second sensing service description information;
- the information of the first area; or
- identification information of a candidate sensing device in the first area.

The second sensing service description information is generated according to the first sensing service description information.

It will be understood that the third sensing service request message is used for requesting the target sensing control function network element to select the target sensing device, thereby ensuring the smooth progress of the sensing service process.

The second sensing service description information is generated according to the first sensing service description information and may be the same as or different from the first sensing service description information. The second sensing service description information may be understood with reference to the description of the first sensing service description information in the foregoing embodiments. The details are omitted herein.

Optionally, the third sensing service request message further includes information of the first area. The third sensing service request message is used for requesting the target sensing control function network element to select the target sensing device according to the information of the first area.

The information of the first area is determined according to the location information of the first user equipment and the relative location range information or the absolute location range information (namely, the second sensing serving area information) associated with the first user equipment.

Optionally, the third sensing service request message further includes identification information of a candidate sensing device in the first area. Here, the identification information of the candidate sensing device includes identification information of one or more candidate sensing devices.

The third sensing service request message is used for requesting the target sensing control function network element to select the target sensing device based on the identification information of the candidate sensing device in the first area.

The identification information of the candidate sensing device in the first area is identification information of all/part of sensing devices currently located in the first area determined by the first network element. The identification information of all/part of the sensing devices currently located in the first area is transmitted to the target sensing control function network clement, whereby the target sensing control function network element selects the target sensing device for executing the sensing service.

The identification information of the candidate sensing device includes a candidate UE ID list and/or a candidate RAN ID list. The candidate UE ID list is identification information of all/part of UEs located within an AOI range determined by the AMF. The candidate RAN ID list is identification information of all/part of RANs located within the AOI range determined by the AMF.

In this embodiment, the first network element is an AMF. The AMF selects a suitable target SCF network element for the sensing service of the first user equipment, and transmits a third sensing service request message to the target SCF network element, whereby the target SCF network element selects a target sensing device according to the third sensing service request message, and the target SCF network element transmits sensing resource configuration information, a sensing measurement task, and sensing measurement control information to the target sensing device subsequently, thereby ensuring the smooth progress of a sensing service process.

Optionally, on the basis of the various embodiments, the first network element includes an access and mobility management function AMF network element or a sensing control function SCF network element.

Optionally, on the basis of the various embodiments, the sensing device includes a sensing terminal device and/or a sensing access network device.

Figure 5:
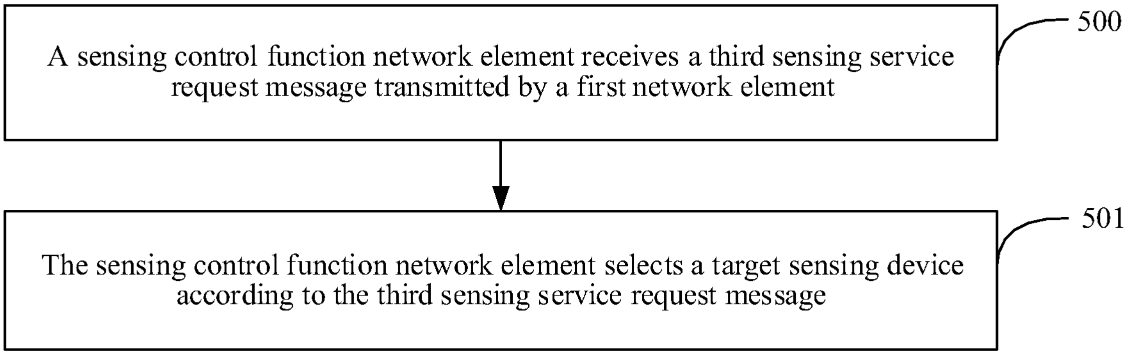
FIG. 5 is a second schematic flowchart of a sensing service processing method according to an embodiment of this application.

FIG. 5 is a second schematic flowchart of a sensing service processing method according to an embodiment of this application. As shown in FIG. 5, an execution entity of the method is a sensing control function SCF network element.

The method includes the following steps:

Step 500: A sensing control function network element receives a third sensing service request message transmitted by a first network element.

It should be noted that the sensing control function network element in this embodiment is a target sensing control function network element selected by the first network element in the foregoing embodiments.

The third sensing service request message includes at least one of the following:

second sensing service description information;

information of a first area; or identification information of a candidate sensing device in the first area.

That is, the sensing control function network element receives the third sensing service request message transmitted by the first network element, and may obtain at least one of the second sensing service description information, the information of the first area, or the identification information of the candidate sensing device in the first area.

The second sensing service description information is generated by the first network element according to the first sensing service description information and may be the same as or different from the first sensing service description information.

The information of the first area is determined by the first network element according to the location information of the first user equipment and the relative location range information or the absolute location range information (namely, the second sensing serving area information) associated with the first user equipment.

The identification information of the candidate sensing device in the first area is identification information of all/part of sensing devices currently located in the first area determined by the first network element.

The identification information of the candidate sensing device includes a candidate UE ID list and/or a candidate RAN ID list. The candidate UE ID list is identification information of all/part of UEs located within an AOI range determined by the AMF. The candidate RAN ID list is identification information of all/part of RANs located within the AOI range determined by the AMF.

Step 501: The sensing control function network element selects a target sensing device according to the third sensing service request message.

In this embodiment, the sensing control function network element selects a target sensing device according to the third sensing service request message, whereby the sensing control function network element transmits sensing resource configuration information, a sensing measurement task, and sensing measurement control information to the target sensing device subsequently, thereby ensuring the smooth progress of a sensing service process.

Optionally, the first network element includes an access and mobility management function AMF network element or a sensing control function SCF network element.

Optionally, the sensing device includes a sensing terminal device and/or a sensing access network device.

Optionally, the second sensing service description information includes at least one of the following:

- sensing service type information;
- sensing object information;
- sensing measurement type information;
- sensing service purpose or application information;
- sensing service granularity information;
- sensing service time information;
- sensing data reporting information; or
- quality of service requirement information of sensing service.

The second sensing service description information may be understood with reference to the description of the first sensing service description information in the foregoing embodiments. The details are omitted herein.

Optionally, the sensing control function network element selects a target sensing device according to the third sensing service request message, including:

The sensing control function network element selects the target sensing device according to the information of the first area, where a serving area of the target sensing device includes the entire or partial first area.

It will be understood that the sensing control function network element determines a sensing device currently located in the first area as the target sensing device according to location information of each sensing device (sensing UE/RAN) in a case that the information of the first area is carried in the third sensing service request message.

The location information of each sensing device may be:

- own location information reported by the sensing device; and
- a location of each sensing device obtained by the sensing control function network element querying from an LMF/AMF/RAN.

The serving area of the target sensing device is the entire first area, indicating that the target sensing device may serve the entire AOI. The serving area of the target sensing device is the partial first area, indicating that the target sensing device may serve the partial AOI. Other parts of the AOI may be served by other sensing devices.

Optionally, the sensing control function network element selects a target sensing device according to the third sensing service request message, including:

The sensing control function network element selects a sensing device with a sensing service capability matching a sensing service corresponding to the second sensing service description information as the target sensing device based on the identification information of the candidate sensing device in the first area and the second sensing service description information.

It will be understood that the sensing control function network element selects the sensing device with the sensing service capability matching the sensing service corresponding to the second sensing service description information as the target sensing device from the candidate sensing device in a case that the identification information of the candidate sensing device in the first area is carried in the third sensing service request message.

In one implementation, if the AMF network element transmits identification information of a candidate sensing device (a candidate UE ID list and/or a candidate RAN ID list), the SCF network element selects sensing UE(s) with a sensing service network capability satisfying a sensing service corresponding to the second sensing service description information from the candidate UE ID list, and/or the SF selects sensing RAN(s) with a sensing service capability satisfying the sensing service corresponding to the second sensing service description information from the candidate RAN ID list.

In some optional embodiments, the method further includes:

The sensing control function network element acquires service sensing capability information of a sensing device in a network.

Here, the sensing device in the network may be all sensing UE/RANs in the entire network, or sensing UE/RANs in the partial network. The partial network may be limited to the first area (AOI range) or may not be limited to the first area.

Optionally, the service sensing capability information includes at least one of the following:

- information indicating whether sensing service is supported or not, for example, supported or not supported;
- supported sensing service type information, for example, type I, type II, and the like;
- supported sensing object information, for example, air, buildings, human bodies, or the like;
- supported sensing measurement range information, for example, absolute range (such as TA list or cell ID list) or relative range (100 meters around sensing UE);
- supported sensing measurement type information, for example, the shape of the sensing object, the heartbeat of the sensing object, the speed of the sensing object, and the like;
- supported sensing service quality of service (QoS) information, where the sensing QoS includes, for example but is not limited to, at least one of a sensing accuracy, a sensing error, a sensing range, a sensing delay, a detection probability, or a false alarm probability, the sensing accuracy includes: a range resolution, an imaging resolution, a moving speed resolution, or an angle resolution, and the sensing error includes: a range error, an imaging error, or a moving speed error;
- supported sensing measurement service purpose or application information, for example, air quality detection, intelligent transportation, and the like;
- supported sensing measurement time information, for example, 07:00 to 10:00 every day available and 22:00 to 24:00 every Monday unavailable; and
- supported sensing data reporting information, for example, supported periodic reporting and/or event-triggered reporting, and supported data reporting formats.

In some optional embodiments, the method further includes:

- the sensing control function network element reselects the target sensing device according to a change of the information of the first area.

It will be understood that if the location information of the first user equipment changes, the information of the first area will also change. If the information of the first area changes, the sensing control function network element needs to reselect the target sensing device according to the changed information of the first area.

The sensing control function network element determines a sensing device currently located in the changed first area as the target sensing device according to location information of each sensing device (sensing UE/RAN).

In some optional embodiments, the method further includes:

The sensing control function network element reselects the target sensing device according to a change of the identification information of the candidate sensing device in the first area.

It will be understood that the sensing UE(s) in the first area may change continuously due to own mobility. Therefore, the identification information of the candidate sensing device in the first area may change. If the identification information of the candidate sensing device in the first area changes, the sensing control function network element needs to reselect the target sensing device according to the changed identification information of the candidate sensing device in the first area.

The sensing control function network element selects a sensing device with a sensing service capability matching a sensing service corresponding to the second sensing service description information as the target sensing device according to the changed identification information of the candidate sensing device in the first area and the second sensing service description information.

On the basis of the foregoing embodiments, the first network element is an access and mobility management function AMF network element. Or, the sensing device includes a sensing terminal device and/or a sensing access network device.

In this embodiment of this application, the sensing control function network element selects a target sensing device according to the third sensing service request message, whereby the sensing control function network element transmits sensing resource configuration information, a sensing measurement task, and sensing measurement control information to the target sensing device subsequently, thereby ensuring the smooth progress of a sensing service process.

Figure 6:
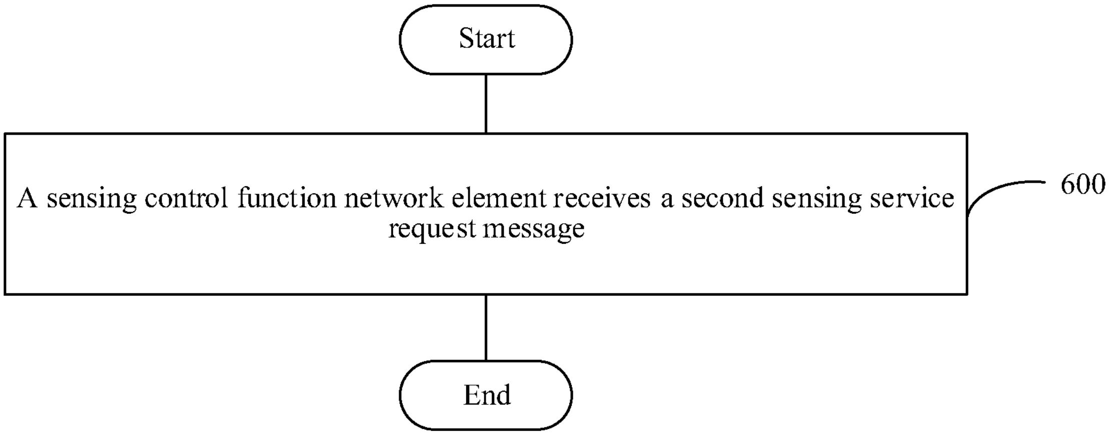
FIG. 6 is a third schematic flowchart of a sensing service processing method according to an embodiment of this application.

FIG. 6 is a third schematic flowchart of a sensing service processing method according to an embodiment of this application. As shown in FIG. 6, an execution entity of the method is a sensing control function network element.

The method includes the following steps:

Step 600: A sensing control function network element receives a second sensing service request message.

The second sensing service request message includes: second sensing service description information and identification information of a target sensing device.

It should be noted that the sensing control function network element in this embodiment is the target sensing control function network element in the foregoing embodiments.

It will be understood that the second sensing service request message is used for requesting the target sensing control function network element to transmit sensing resource configuration information, a sensing measurement task, and sensing measurement control information to the target sensing device corresponding to the identification information, thereby ensuring the smooth progress of the sensing service process.

The second sensing service description information in the second sensing service request message is generated by the first network element according to the first sensing service description information and may be the same as or different from the first sensing service description information.

Optionally, the second sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

The above information may be understood with reference to the description in the foregoing embodiments and will not be repeated herein.

The first network element selects a target sensing control function network element and a target sensing device, and transmits a second sensing service request message to the target sensing control function network element. The second sensing service request message carries second sensing service description information and identification information of the target sensing device. The target sensing control function network element receives the second sensing service request message transmitted by the first network element, obtains the second sensing service description information and the identification information of the target sensing device, and transmits sensing resource configuration information, a sensing measurement task, and sensing measurement control information to the target sensing device corresponding to the identification information, thereby ensuring the smooth progress of the sensing service process.

Optionally, since the sensing terminal device (sensing UE) in the first area may leave the first area due to own movement, the first network element needs to continuously track and match the sensing terminal device (sensing UE) matched with the sensing service in the first area, determine a new target sensing terminal device, and transmit identification information of the new target sensing terminal device to a target SCF network element, whereby the target SCF network element transmits the sensing resource configuration information, the sensing measurement task, and the sensing measurement control information to the new target sensing device, thereby ensuring the smooth progress of the sensing service process.

A signaling interaction flow of the sensing service processing method provided by this embodiment of this application is shown below.

Figure 7:
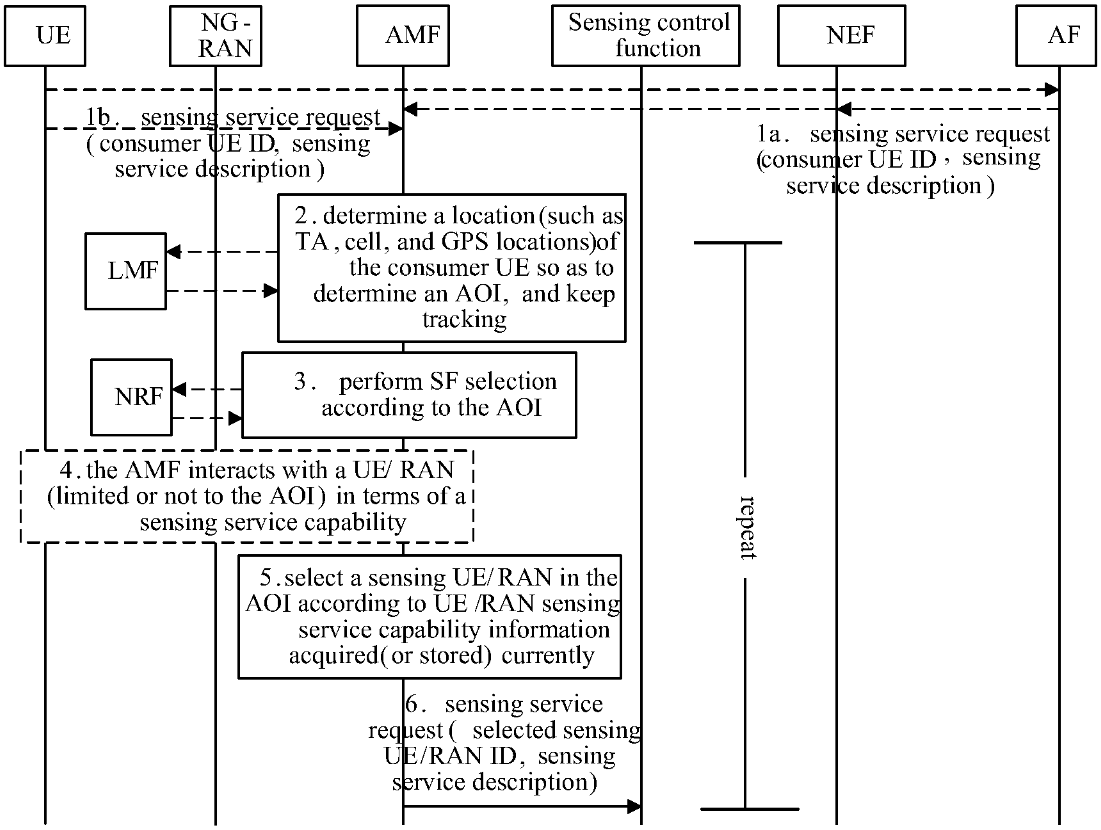
FIG. 7 is a first schematic interaction flowchart of a sensing service processing method according to an embodiment of this application.

FIG. 7 is a first schematic interaction flowchart of a sensing service processing method according to an embodiment of this application. The interaction flow includes the following steps:

Step 0: A service object (Consumer UE) transmits an application layer message to an AF, where the application layer message carries an ID of the service object and sensing service description information.

Step 1*a*: The AF transmits a sensing service request message to an AMF through an NEF, where sensing service description information is carried.

It should be noted that the sensing service description information in 1*a* may be the same as or different from that in step 0. In a case that the two pieces of information are different, the AF actually extracts or generates the corresponding sensing service description information in 1*a* according to the sensing service description information in step 0.

Optionally, the sensing service request message further includes identification information of a service object of a sensing service, such as the consumer UE ID or the Consumer UE IP address, which is used for indicating a user equipment identifier triggering the sensing service, or explaining a user identifier corresponding to the service object of the sensing service.

If the AF belongs to an operator trusted AF, step 1*a* does not need to be performed by the NEF.

Or,

Step 1*b*: The Consumer UE directly transmits the sensing service request message to the AMF.

The content of the sensing service request message in step 1*b* is similar to that in step 1*a*.

Step 1*a* and step 1*b* may both be an alternative relationship.

In one implementation, the consumer UE may use an NAS message to transmit the sensing service request message to the AMF.

Step 2: The AMF determines location information of the consumer UE and determines an AOI according to the location information.

It should be noted that in this embodiment of this application, the location of a service object (consumer UE) of a sensing service may change continuously due to the movement thereof. Therefore, the AMF needs to keep track of the location of the consumer UE and determine the corresponding AOI. The AMF may subscribe the location of the consumer UE to an RAN or to an LMF for tracking the location of the consumer UE.

Step 3: The AMF selects a sensing control function SCF network element according to the AOI.

Step 4: The AMF interacts service sensing capability information with a sensing device in a network.

The sensing device in the network here includes a sensing UE and/or a sensing RAN within an AMF serving area.

Trigger scenarios where the sensing UE reports own service sensing capability information to the AMF include but are not limited to at least one of the following:

- initially entering the AMF serving area (initial registration);
- the sensing UE performs mobility registration in the AMF serving area;
- a sensing service capability of the sensing UE changes; or
- the AMF/SF/RAN issues a service sensing capability information acquisition request to the sensing UE.

The service sensing capability information reported to the AMF by the sensing UE includes but is not limited to at least one of the following:

- sensing service measurement supported or not, for example, supported or not supported;
- measurement-supported sensing service type information, for example, type I, type II, and the like;
- supported sensing object information, for example, air, buildings, human bodies, or the like;
- supported sensing measurement range information, for example, absolute range (such as TA list or cell ID list) or relative range (100 meters around sensing UE);
- supported sensing measurement type information, for example, the shape of the sensing object, the heartbeat of the sensing object, the speed of the sensing object, and the like;
- supported sensing service quality of service (QoS) information, where the sensing QoS includes, for example but is not limited to, at least one of a sensing accuracy, a sensing error, a sensing range, a sensing delay, a detection probability, or a false alarm probability, the sensing accuracy includes: a range resolution, an imaging resolution, a moving speed resolution, or an angle resolution, and the sensing error includes: a range error, an imaging error, or a moving speed error;
- supported sensing measurement service purpose or application information, for example, air quality detection, intelligent transportation, and the like;
- supported sensing measurement time information, for example, 07:00 to 10:00 every day available and 22:00 to 24:00 every Monday unavailable; and
- supported sensing data reporting information, for example, supported periodic reporting and/or event-triggered reporting, and supported data reporting formats.

Trigger scenarios where the Sensing RAN reports own service sensing capability information to the AMF include but are not limited to at least one of the following:

- the Sensing RAN establishes a device-to-device connection with the AMF;
- the Sensing RAN establishes a user granularity connection with the AMF;
- a capability of the Sensing RAN changes; or
- the AMF/SF actively acquires service sensing capability information from the sensing RAN.

The service sensing capability information reported by the sensing RAN to the AMF is similar to the above service sensing capability information of the sensing UE and will not be repeated herein.

Step 5: The AMF selects the sensing UE/RAN in the AOI as the target sensing measurement device of the sensing service according to the sensing service request message and the capability information of the sensing UE/RAN.

In addition, the sensing UE(s) in the AOI may change continuously due to own mobility. Therefore, the AMF needs to continuously track and match the sensing UE in the AOI matched with the sensing service. And the SCF is notified of a new sensing UE, whereby the SCF issues the sensing service control information to the new sensing UE.

Step 6: The AMF forwards the sensing service request message to the SCF network element selected in step 3, where the sensing service request message carries the sensing service description information and the identification information of the selected sensing device (sensing UE/RAN).

The sensing service description information transmitted here is generated by the AMF according to the sensing service description information received from the AF, and the two pieces of information may be the same or different.

After the above steps, the AMF selects a suitable SCF for the sensing service of the consumer UE, and selects the sensing device. Then the AMF transmits an identifier of the sensing device to the SCF, whereby the SCF transmits sensing resource configuration information, a sensing measurement task, and sensing measurement control information to the sensing device subsequently, thereby ensuring the smooth progress of the sensing service process.

Figure 8:
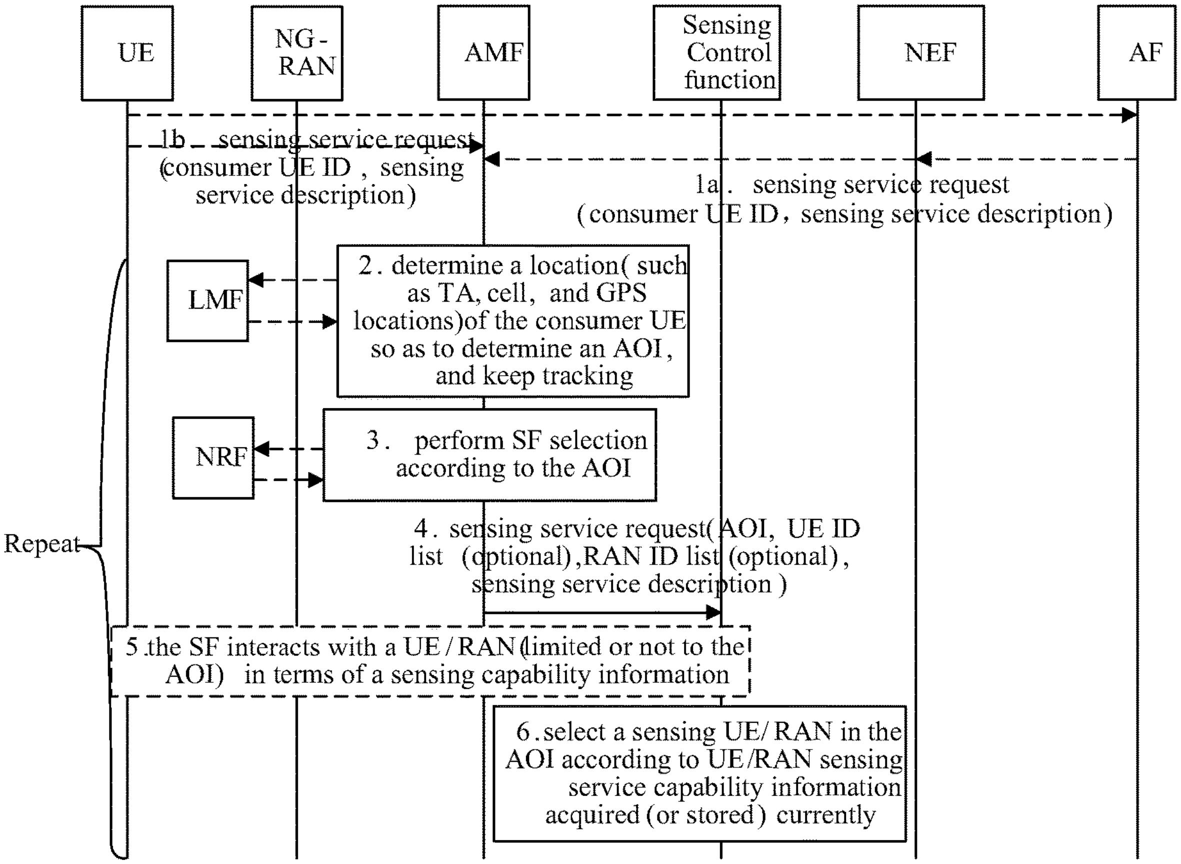
FIG. 8 is a second schematic interaction flowchart of a sensing service processing method according to an embodiment of this application.

FIG. 8 is a second schematic interaction flowchart of a sensing service processing method according to an embodiment of this application. The interaction flow includes the following steps:

Steps 1-3 are the same as steps 1-3 in FIG. 7, and will not be repeated herein.

Step 4: The AMF forwards a sensing service request message to the SCF, where the sensing service request message carries at least one of the following: second sensing service description information; information of a first area (AOI); or identification information of a candidate sensing device in the first area.

Step 5: The SCF and the sensing UE/RAN in the network interact in terms of service sensing capability information.

The sensing UE/RAN in the network may be all sensing UE/RANs in the entire network, or sensing UE/RANs in the partial network. The partial network may be limited to the AOI range acquired in step 4 or may not be limited thereto.

Optionally, the partial network may be a serving area of the SCF. In other words, the SCF and the sensing UE/RAN within the sensing area may interact in terms of service sensing capability information.

In one implementation, trigger scenarios where the sensing UE reports own service sensing capability information to the SCF include but are not limited to at least one of the following:

- initially entering a serving area of the SCF;
- the Sensing UE establishes a device-to-device connection with the SCF;
- the sensing UE periodically updates a sensing service capability in the serving area of the SCF;
- a sensing service capability of the sensing UE changes; or
- the AMF/SF/RAN issues a service sensing capability information acquisition request to the sensing UE.

The Sensing UE reports the service sensing capability information to the SCF similar to that described in step 4 of FIG. 7.

Trigger scenarios where the Sensing RAN reports own service sensing capability information to the SCF include but are not limited to at least one of the following:

- the Sensing RAN establishes a device-to-device connection with the SCF;
- the Sensing RAN establishes a user granularity connection with the SCF;
- a capability of the Sensing RAN changes; or
- the AMF/SF actively acquires service sensing capability information from the sensing RAN.

The service sensing capability information reported by the sensing RAN to the SCF is similar to the service sensing capability information of the sensing UE in the foregoing embodiments and will not be repeated herein.

After the above steps, the AMF selects a suitable SCF for the sensing service of the consumer UE, and the SCF selects the sensing device, whereby the SCF transmits sensing resource configuration information, a sensing measurement task, and sensing measurement control information to the sensing device subsequently, thereby ensuring the smooth progress of the sensing service process.

Figure 9:
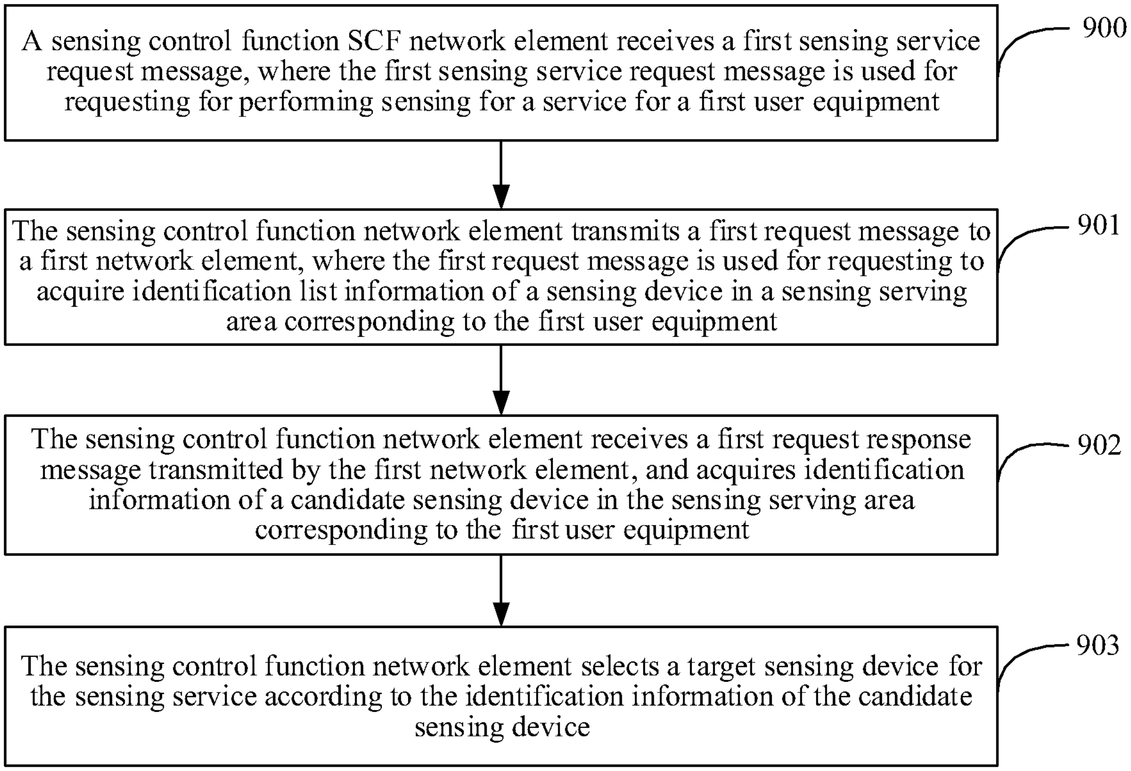
FIG. 9 is a fourth schematic flowchart of a sensing service processing method according to an embodiment of this application.

FIG. 9 is a fourth schematic flowchart of a sensing service processing method according to an embodiment of this application. As shown in FIG. 9, an execution entity of the method is a sensing control function network element.

The method includes the following steps:

Step 900: A sensing control function SCF network element receives a first sensing service request message, where the first sensing service request message is used for requesting for performing sensing for a service for a first user equipment.

The first user equipment UE may be an Internet of Things device, or a device used by a user, or the device used by the user refers to the user.

The sensing service is carried out for the first user equipment UE, which has the following meanings:

That is, a service object of the sensing service is the first UE, and the sensing service process is used for sensing and measuring a certain measurement quantity. The measurement quantity is associated with the first UE. This application has, but not limited to, the following situations:

The first UE may be a sensing signal measurer, which receives a signal transmitted by a peripheral. The first UE measures the measurement quantity. Or, the first UE may transmit a sensing signal, whereby the peripheral measures the sensing signal to obtain the measurement quantity.

Sensing signals are transmitted, received, and measured between other peripherals of the first UE, so as to evaluate the influence of signals passing through a surrounding environment of the first UE and acquire the measurement quantity associated with the first UE.

For example, the first UE refers to the user, and transmits a sensing physical signal using a transmitting device around the user. The physical signal passes through the environment around the user and is affected by the breathing of the user, and reaches a signal receiving device. The signal receiving device performs analysis and measurement to acquire the measurement quantity of the sensing signal affected by the breathing of the user.

Optionally, the first sensing service request message is transmitted by the AF, or by the first user equipment, or by the AF through a network exposure function (NEF) network element.

In one implementation, before step 900, the method further includes the following steps:

Step 0: The consumer UE may interact with the AF in an application layer for sensing task information, where the sensing task information includes identification information of the consumer UE (such as a consumer UE ID or a Consumer UE IP address) and third sensing service description information.

Thus, the AF may determine that the consumer UE requests to execute a sensing service corresponding to the third sensing service description information.

Step 1*a*: The AF transmits a first sensing service request message to the SCF network element through the NEF network element.

If the AF belongs to an operator trusted AF, step 1*a* does not need to be performed by the NEF network element.

Step 1*b*: Optionally, the consumer UE may also directly transmit the first sensing service request message to the SCF network element.

In one implementation, the consumer UE may use an NAS message to transmit the first sensing service request message to the SCF network element.

Optionally, the first sensing service request message includes: identification information of the first user equipment and first sensing service description information.

The first sensing service description information includes at least one of the following:

- sensing service type information;
- sensing object information;
- sensing measurement type information;
- sensing service purpose or application information;
- sensing service granularity information;
- sensing service time information;
- sensing data reporting information; or
- quality of service requirement information of sensing service.

The identification information of the first user equipment and the first sensing service description information may be described with reference to the description in the foregoing embodiments and will not be repeated herein.

Optionally, the first sensing service request message further includes: first sensing serving area information, where the first sensing serving area information includes absolute location range information or relative location range information corresponding to the first user equipment.

The first sensing serving area information may be understood with reference to the description in the foregoing embodiments and will not be repeated herein.

Step 901: The sensing control function network element transmits a first request message to a first network element, where the first request message is used for requesting to acquire identification information of a sensing device in a sensing serving area corresponding to the first user equipment.

Optionally, the sensing serving area corresponding to the first user equipment includes absolute location range information or relative location range information corresponding to the first user equipment.

The sensing serving area corresponding to the first user equipment is represented by third sensing serving area information.

In a case that the first sensing service request message received by the sensing control function network element carries the first sensing serving area information, the third sensing serving area information is the same as or different from the first sensing serving area information. In a case that the two pieces of information are different, the third sensing serving area information is generated by the sensing control function network element according to the first sensing serving area information.

Optionally, the third sensing serving area information may be carried in a first request message and transmitted to a first network element (such as an AMF network element) through the first request message. That is, the first request message includes: identification information (such as a consumer UE ID or a Consumer UE IP address) of the first user equipment and the third sensing serving area information.

Optionally, the first request message may be Namf_EventExposure_Subscribe.

Or, the third sensing serving area information is configured locally in the first network element, and neither the first sensing service request message nor the first request message carries the information.

In one implementation, the sensing serving area of the consumer UE may be a relative range (such as within 20 meters of the periphery centered by the consumer UE). The relative range may be carried in the first request message or configured in the AMF by default. In this case, the first request message is used for requesting the AMF to detect a UE ID list and/or an RAN ID list within the relative range of the consumer UE.

In another implementation, the sensing serving area of the consumer UE may be an absolute range (such as Tiananmen Square), and the absolute range information is carried in the first request message for instructing the AMF to provide the UE list and/or the RAN list within the absolute range at the same time when detecting the occurrence of an event that the consumer UE enters the absolute range.

Optionally, the first network element includes an access and mobility management function AMF network element. Or, the sensing device includes a sensing terminal device (sensing UE) and/or a sensing access network device (sensing RAN).

Step 902: The sensing control function network element receives a first request response message transmitted by the first network element, and acquires identification information of a candidate sensing device in the sensing serving area corresponding to the first user equipment.

After receiving the first request message, the first network element determines the information of the first area according to the location information of the first user equipment and the sensing serving area corresponding to the first user equipment, and acquires the identification information of the candidate sensing device in the first area.

The identification information of the candidate sensing device includes identification information of one or more candidate sensing devices.

Here, the candidate sensing device in the first area may be all UE ID lists and/or RAN ID lists in the first area identified by the first network element. Or, the candidate sensing device in the first area may be UE ID lists and/or RAN ID lists for carrying out sensing services in the first area identified by the first network element.

The first network element transmits the identification information of the candidate sensing device in the sensing serving area corresponding to the first user equipment to the sensing control function network element through the first request response message.

For example, the AMF determines an AOI according to the location information of the consumer UE and the first sensing serving area information, and the AMF determines a UE ID list and/or an RAN ID list within the AOI. The AMF transmits the UE ID list and/or the RAN ID list within the AOI to the SCF.

Optionally, the AMF may transmit the UE ID list and/or the RAN ID list using a Namf_EventExposure_Notify message.

It should be noted that the location of the first user equipment may change continuously due to the movement thereof. Therefore, the first network element needs to track the location information of the first user equipment all the time, whereby the first area will change, and the identification information of the candidate sensing device in the sensing serving area corresponding to the first user equipment determined by the first network element changes accordingly.

In addition, since a sensing terminal device (sensing UE) in the first area may leave the first area due to own movement, the first network element also needs to continuously track and determine identification information of a candidate sensing terminal device in the sensing serving area corresponding to the first user equipment.

Step 903: The sensing control function network element selects a target sensing device for the sensing service according to the identification information of the candidate sensing device.

Optionally, the method further includes:

The sensing control function network element acquires service sensing capability information of a sensing device in a network.

The network here may be the entire or partial network. The partial network may be limited to the first area or may not be limited thereto.

Optionally, the partial network may be a serving area of the sensing control function SCF network element. That is, the SCF and the sensing UE/RAN within the sensing area may interact in terms of service sensing capability information.

Optionally, the sensing control function network element selects a target sensing device for the sensing service according to the identification information of the candidate sensing device, including:

The sensing control function network element selects a sensing device with a sensing service capability matching the sensing service in the candidate sensing device as the target sensing device according to the service sensing capability information of the sensing device in the network.

For example, the SCF network element selects sensing UE(s) with a sensing service network capability satisfying the sensing service from the candidate UE ID list, and/or the SCF network element selects sensing RAN(s) with a sensing service capability satisfying the sensing service from the candidate RAN ID list.

Optionally, the service sensing capability information includes at least one of the following:

- information indicating whether sensing service is supported or not;
- supported sensing service type information;
- supported sensing object information;
- supported sensing measurement range information;
- supported sensing measurement type information;
- supported quality of service QoS information of sensing service;
- supported sensing measurement service purpose or application information;
- supported sensing measurement time information; or
- supported sensing data reporting information.

The service sensing capability information may be understood with reference to the description in the foregoing embodiments and will not be repeated herein.

In this embodiment, user equipment or AF triggers to transmit a sensing service request message. After receiving the sensing service request message, the sensing control function SCF network element transmits identification information of a sensing device in a sensing serving area corresponding to a first user equipment to the first network element, and selects a target sensing device for the sensing service according to the identification information, whereby the sensing control function SCF network element transmits sensing resource configuration information, a sensing measurement task, and sensing measurement control information to the target sensing device subsequently, thereby ensuring the smooth progress of a sensing service process.

Figure 10:
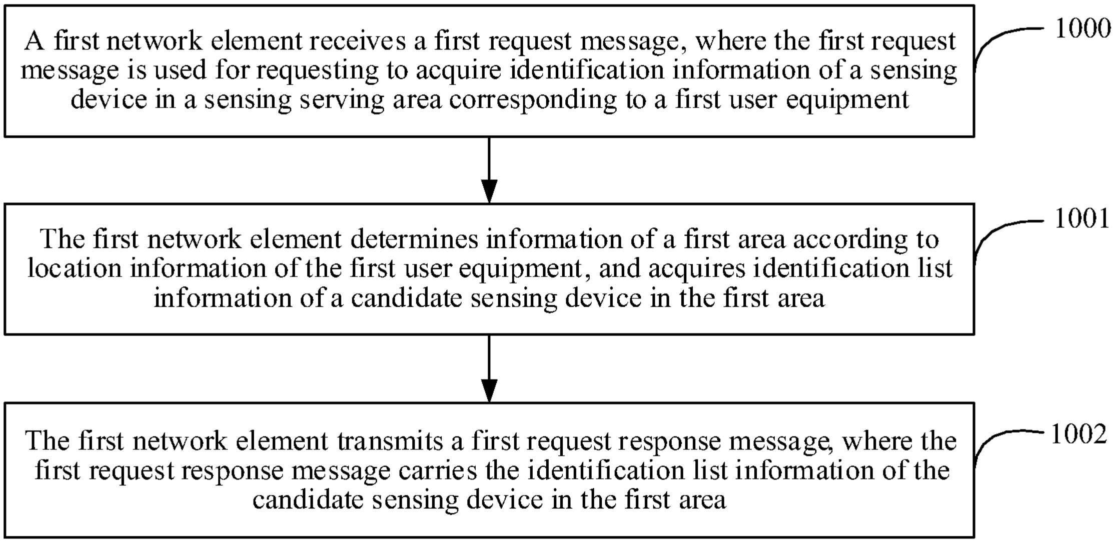
FIG. 10 is a fifth schematic flowchart of a sensing service processing method according to an embodiment of this application.

FIG. 10 is a fifth schematic flowchart of a sensing service processing method according to an embodiment of this application. As shown in FIG. 10, an execution entity of the method is a first network element. Optionally, the first network element includes: an access and mobility management function AMF network element. The sensing device includes a sensing terminal device and/or a sensing access network device.

The method includes the following steps:

Step 1000: A first network element receives a first request message, where the first request message is used for requesting to acquire identification information of a sensing device in a sensing serving area corresponding to a first user equipment.

Step 1001: The first network element determines information of a first area according to location information of the first user equipment, and acquires identification information of a candidate sensing device in the first area.

Step 1002: The first network element transmits a first request response message, where the first request response message carries the identification information of the candidate sensing device in the first area.

This embodiment is an action description of the embodiment shown in FIG. 9, and therefore this embodiment may be understood with reference to the description in the embodiment shown in FIG. 9 and will not be repeated herein.

Optionally, the first request message includes: identification information of the first user equipment and third sensing serving area information.

The third sensing serving area information includes absolute location range information or relative location range information corresponding to the first user equipment.

The third sensing serving area information may be understood with reference to the foregoing embodiments and will not be repeated herein.

Optionally, the determining information of a first area according to location information of the first user equipment includes:

- determining the information of the first area according to the location information of the first user equipment and the third sensing serving area information.

After receiving the first request message, the first network element determines the information of the first area according to the location information of the first user equipment and the sensing serving area corresponding to the first user equipment, and acquires the identification information of the candidate sensing device in the first area.

The first network element transmits the identification information of the candidate sensing device in the sensing serving area corresponding to the first user equipment to the sensing control function network element through the first request response message.

For example, the AMF determines an AOI according to the location information of the consumer UE and the third sensing serving area information, and the AMF determines a UE ID list and/or an RAN ID list within the AOI. The AMF transmits the UE ID list and/or the RAN ID list within the AOI to the SCF.

Optionally, the AMF may transmit the UE ID list and/or the RAN ID list using a Namf_EventExposure_Notify message.

It should be noted that the location of the first user equipment may change continuously due to the movement thereof. Therefore, the first network element needs to track the location information of the first user equipment all the time, whereby the first area will change, and the identification information of the candidate sensing device in the sensing serving area corresponding to the first user equipment determined by the first network element changes accordingly.

In addition, since a sensing terminal device (sensing UE) in the first area may leave the first area due to own movement, the first network element also needs to continuously track and determine identification information of a candidate sensing terminal device in the sensing serving area corresponding to the first user equipment.

In this embodiment, user equipment or AF triggers to transmit a sensing service request message. After receiving the sensing service request message, the sensing control function SCF network element transmits identification information of a sensing device in a sensing serving area corresponding to a first user equipment to the first network element. After receiving the request, the first network element returns the identification information of the sensing device in the sensing serving area corresponding to the first user equipment, whereby the SCF network element selects a target sensing device for the sensing service according to the identification information, and the sensing control function SCF network element transmits sensing resource configuration information, a sensing measurement task, and sensing measurement control information to the target sensing device subsequently, thereby ensuring the smooth progress of a sensing service process.

Figure 11:
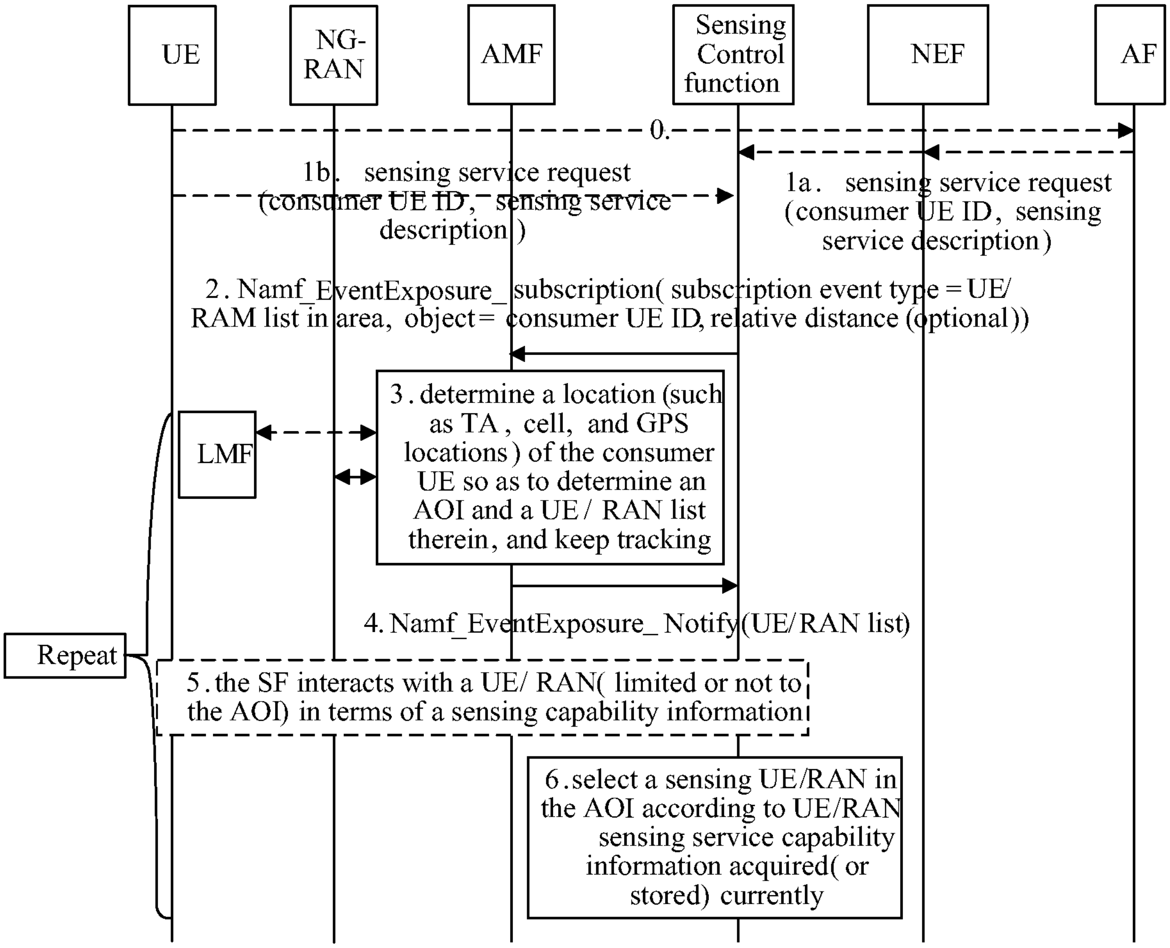
FIG. 11 is a third schematic interaction flowchart of a sensing service processing method according to an embodiment of this application.

FIG. 11 is a third schematic interaction flowchart of a sensing service processing method according to an embodiment of this application. As shown in FIG. 11, the interaction flow includes the following steps:

Step 0: A service object (Consumer UE) transmits an application layer message to an AF, where the application layer message carries an ID of the service object and sensing service description information.

Step 1*a*: The AF transmits a sensing service request message to an SCF network through an NEF network element, where sensing service description information is carried.

It should be noted that the sensing service description information in 1*a* may be the same as or different from that in step 0. In a case that the two pieces of information are different, the AF actually extracts or generates the corresponding sensing service description information in 1*a* according to the sensing service description information in step 0.

Optionally, the sensing service request message further includes identification information of a service object of a sensing service, such as the consumer UE ID or the Consumer UE IP address, which is used for indicating a user equipment identifier triggering the sensing service, or explaining a user identifier corresponding to the service object of the sensing service.

If the AF belongs to an operator trusted AF, step 1*a* does not need to be performed by the NEF.

Or,

Step 1*b*: The Consumer UE directly transmits the sensing service request message to the SCF.

The content of the sensing service request message in step 1*b* is similar to that in step 1*a*.

Step 2: The SCF transmits a first request message to an AMF, where the first request message is used for requesting to acquire identification information of a sensing device in a sensing serving area corresponding to a first user equipment.

Step 3: The AMF determines an AOI according to the location of a consumer UE and a serving area of a sensing service of the consumer UE, and the AMF determines identification information (UE ID list and/or RAN ID list) of a sensing device in the AOI.

Step 4: The AMF transmits the identification information (UE ID list and/or RAN ID list) of the sensing device determined in step 3 to the SCF.

For example, the AMF may transmit the UE list and/or the RAN list using a Namf_EventExposure_Notify message.

Step 5: The SCF and the sensing UE/RAN in the network interact in terms of service sensing capability information.

Step 6: An SF selects a sensing device matched with the sensing service from the UE ID list and/or the RAN ID list transmitted by the AMF.

After the above steps, the SF selects a sensing device for a sensing service according to a sensing service request message, whereby the SF transmits sensing resource configuration information, a sensing measurement task, and sensing measurement control information to the sensing device subsequently, thereby ensuring the smooth progress of the sensing service process.

Figure 12:
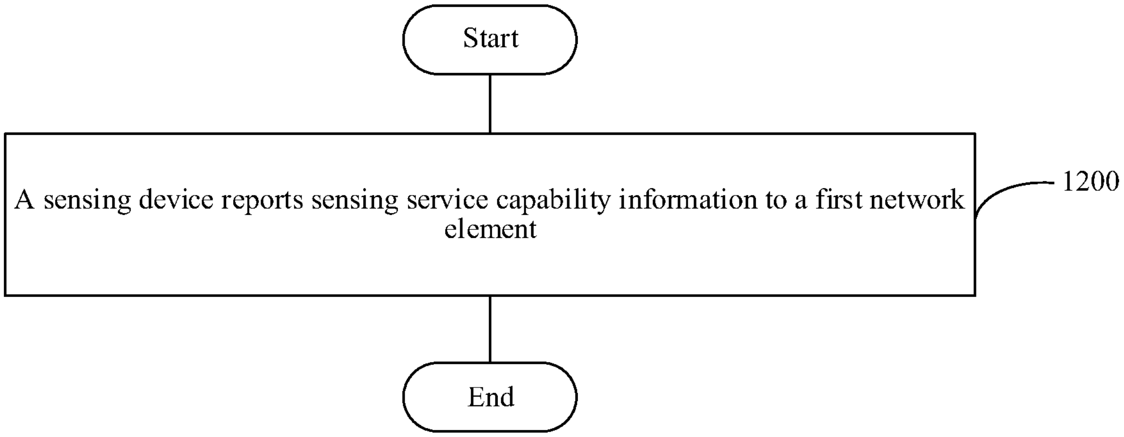
FIG. 12 is a sixth schematic flowchart of a sensing service processing method according to an embodiment of this application.

FIG. 12 is a sixth schematic flowchart of a sensing service processing method according to an embodiment of this application. As shown in FIG. 12, an execution entity of the method is a sensing device. The sensing device includes a sensing UE and/or a sensing RAN.

The method includes the following steps:

Step 1200: A sensing device reports service sensing capability information to a first network element.

The service sensing capability information includes at least one of the following:

- information indicating whether sensing service is supported or not;
- supported sensing service type information;
- supported sensing object information;
- supported sensing measurement range information;
- supported sensing measurement type information;
- supported quality of service QoS information of sensing service;
- supported sensing measurement service purpose or application information;
- supported sensing measurement time information; or
- supported sensing data reporting information.

The service sensing capability information may be understood with reference to the description in the foregoing embodiments and will not be repeated herein.

Optionally, the sensing device includes a sensing terminal device and/or a sensing access network device. Or,

- the first network element includes an access and mobility management function AMF network element or a sensing control function network element.

Optionally, in a case that the sensing device is the sensing terminal device and the first network element is the access and mobility management function AMF network element, a sensing device reports service sensing capability information to a first network element, including:

The sensing device reports the service sensing capability information to the first network element in a case that a first service sensing capability information reporting trigger condition is satisfied.

The first service sensing capability information reporting trigger condition includes:

- the sensing device initially enters a serving area of the first network element;
- the sensing device performs mobility registration or periodic registration in the serving area of the first network element;
- a sensing service capability of the sensing device changes; and
- the sensing device receives a service sensing capability information acquisition request.

It will be understood that the first service sensing capability information reporting trigger condition includes:

- the sensing terminal device initially enters a serving area of the AMF network element;
- the sensing terminal device performs mobility registration or periodic registration in the serving area of the AMF network element;
- a sensing service capability of the sensing terminal device changes; and
- the sensing terminal device receives a service sensing capability information acquisition request.

The sensing terminal device reports the service sensing capability information to the AMF network element in a case that the first service sensing capability information reporting trigger condition is satisfied.

Optionally, in a case that the sensing device is the sensing access network device and the first network element is the access and mobility management function AMF network element, a sensing device reports service sensing capability information to a first network element, including:

The sensing device reports the service sensing capability information to the first network element in a case that a second service sensing capability information reporting trigger condition is satisfied.

The second service sensing capability information reporting trigger condition includes:

- the sensing device establishes a device-to-device connection with the first network element;
- the sensing device establishes a user granularity connection with the first network element;
- a sensing service capability of the sensing device changes; and the sensing device receives a service sensing capability information acquisition request.

It will be understood that the second service sensing capability information reporting trigger condition includes:

the sensing access network device establishes a device-to-device connection with the AMF network element;

the sensing access network device establishes a user granularity connection with the AMF network element;

a sensing service capability of the sensing access network device changes; and the sensing access network device receives a service sensing capability information acquisition request.

The sensing access network device reports the service sensing capability information to the AMF network element in a case that the second service sensing capability information reporting trigger condition is satisfied.

Optionally, in a case that the sensing device is the sensing terminal device and the first network element is the sensing control function network element, a sensing device reports service sensing capability information to a first network element, including:

The sensing device reports the service sensing capability information to the first network element in a case that a third service sensing capability information reporting trigger condition is satisfied.

The third service sensing capability information reporting trigger condition includes:

the sensing device initially enters a serving area of the first network element;

the sensing device establishes a device-to-device connection with the first network element;

the sensing device periodically reports the sensing service capability in the serving area of the first network element;

a sensing service capability of the sensing device changes; and the sensing device receives a service sensing capability information acquisition request.

It will be understood that the third service sensing capability information reporting trigger condition includes:

the sensing terminal device initially enters a serving area of the SCF network element;

the sensing terminal device establishes a device-to-device connection with the SCF network element;

the sensing terminal device periodically reports the sensing service capability in the serving area of the SCF network element;

a sensing service capability of the sensing terminal device changes; and the sensing terminal device receives a service sensing capability information acquisition request.

The sensing terminal device reports the service sensing capability information to the SCF network element in a case that the third service sensing capability information reporting trigger condition is satisfied.

Optionally, in a case that the sensing device is the sensing access network device and the first network element is the sensing control function network element, a sensing device reports service sensing capability information to a first network element, including:

The sensing device reports the service sensing capability information to the first network element in a case that a fourth service sensing capability information reporting trigger condition is satisfied.

The fourth service sensing capability information reporting trigger condition includes:

the sensing device establishes a device-to-device connection with the first network element;

the sensing device establishes a user granularity connection with the first network element;

a sensing service capability of the sensing device changes; and the sensing device receives a service sensing capability information acquisition request.

It will be understood that the fourth service sensing capability information reporting trigger condition includes:

the sensing access network device establishes a device-to-device connection with the SCF network element;

the sensing access network device establishes a user granularity connection with the SCF network element;

a sensing service capability of the sensing access network device changes; and the sensing access network device receives a service sensing capability information acquisition request.

The sensing access network device reports the service sensing capability information to the SCF network element in a case that the fourth sensing service capability information reporting trigger condition is satisfied.

In this embodiment of this application, in a case that a service sensing capability information reporting trigger condition is satisfied, a sensing device reports service sensing capability information to a first network element, whereby the first network element may select the sensing device matching a sensing service according to service sensing capability information, thereby facilitating the smooth progress of a sensing service process.

It should be noted that scenarios where the embodiments shown in FIG. 3 to FIG. 8 may be applicable are: a plurality of SCFs in the network correspond to different sensing areas or sensing service types, and a Consumer AF or a Consumer UE needs to use the first network element to assist in selecting an SCF, and use the first network element or the selected SCF to select a Sensing UE/RAN.

Scenarios where the embodiments shown in FIG. 9 to FIG. 11 may be applicable are: there is only one or a few SCFs for different areas in the network to serve the sensing service. The Consumer AF or the Consumer UE needs to be relatively easy to select the corresponding SCF.

It should be noted that the foregoing embodiments of this application describe an example where SCFs and AMFs are independently deployed but may be deployed together. For example, SCFs are combined on AMFs, or vice versa. In this way, the methods of the foregoing embodiments are also applicable, except that the steps performed separately need to be combined together.

It should be noted that the execution entity of the sensing service processing method provided by this embodiment of this application may be a sensing service processing apparatus or a control module used for executing the sensing service processing method in the sensing service processing apparatus. In this embodiment of this application, the sensing service processing apparatus provided by this embodiment of this application is explained with an example where the sensing service processing apparatus performs the sensing service processing method.

Figure 13:
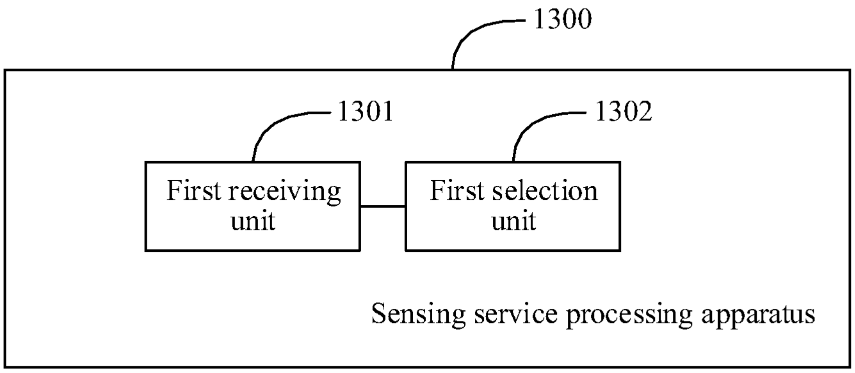
FIG. 13 is a first schematic structure diagram of a sensing service processing apparatus according to an embodiment of this application.

FIG. 13 is a first schematic structure diagram of a sensing service processing apparatus according to an embodiment of this application. As shown in FIG. 13, the sensing service processing apparatus 1300 includes:

a first receiving unit 1301, configured to receive a first sensing service request message, where the first sensing service request message is used for requesting for performing sensing for a service for a first user equipment; and a first selection unit 1302, configured to select a target sensing control function network element and/or a target sensing device according to location information of the first user equipment.

In this embodiment of this application, a first network element processes a sensing service request message, and the first network element selects a suitable sensing control function network element and/or sensing device for a sensing service of a first user equipment according to location information of the first user equipment, so as to ensure the smooth progress of a sensing service process based on a user granularity.

Optionally, the first sensing service request message includes identification information of the first user equipment and first sensing service description information.

The first sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

Optionally, the first sensing service request message further includes: first sensing serving area information, where the first sensing serving area information includes absolute location range information or relative location range information corresponding to the first user equipment.

Optionally, the apparatus further includes:

a second selection unit, configured to reselect the target sensing control function network element and/or the target sensing device according to an update of the location information of the first user equipment.

Optionally, the first selection unit is configured to:

determine information of a first area according to the location information of the first user equipment and second sensing serving area information; and select the target sensing control function network element and/or the target sensing device according to the information of the first area, where a serving area of the target sensing control function network element and/or the target sensing device includes the entire or partial first area.

Optionally, the selecting the target sensing control function network element and/or the target sensing device according to the information of the first area includes:

the first network element queries the target sensing control function network element and/or the target sensing device from a network repository function NRF network element according to the information of the first area.

Optionally, the apparatus further includes:

a first acquisition unit, configured to acquire service sensing capability information of a sensing control function network element and/or a sensing device in a network.

Optionally, the selecting the target sensing control function network element and/or the target sensing device according to the information of the first area includes:

selecting a sensing control network element with a sensing service capability matching the sensing service in the first area as the target sensing control function network element according to the service sensing capability information of the sensing control function network element in the network and the first sensing service description information; and/or, selecting a sensing device with a sensing service capability matching the sensing service in the first area as the target sensing device according to the service sensing capability information of the sensing device in the network and the first sensing service description information.

Optionally, the service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

Optionally, the apparatus further includes:

a first transmitting unit, configured to transmit a second sensing service request message to the target sensing control function network element in a case that the first network element selects the target sensing device.

The second sensing service request message includes: second sensing service description information and identification information of the target sensing device, where the second sensing service description information is generated according to the first sensing service description information.

Optionally, the apparatus further includes:

a second transmitting unit, configured to transmit, by the first network element, a third sensing service request message to the target sensing control function network element in a case that the first network element does not select the target sensing device.

The third sensing service request message includes at least one of the following:

second sensing service description information;

the information of the first area; or identification information of a candidate sensing device in the first area.

The second sensing service description information is generated according to the first sensing service description information.

Optionally, the first network element includes an access and mobility management function AMF network element or a sensing control function SCF network element.

Optionally, the sensing device includes a sensing terminal device and/or a sensing access network device.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiments shown in FIG. 3 to FIG. 4, and achieve the same technical effect. The details are omitted herein to avoid repetition.

Figure 14:
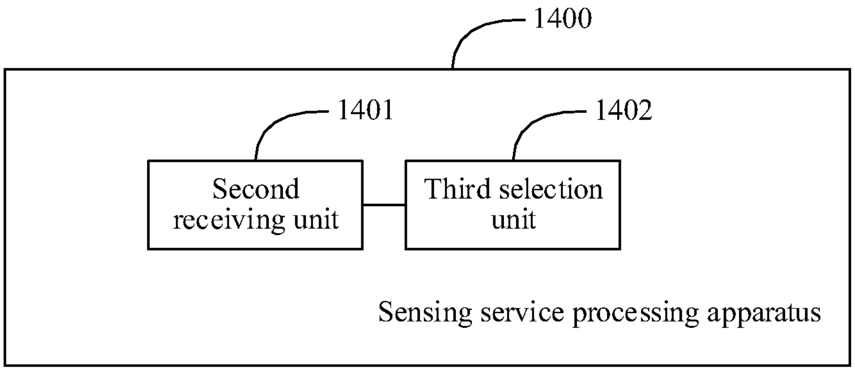
FIG. 14 is a second schematic structure diagram of a sensing service processing apparatus according to an embodiment of this application.

FIG. 14 is a second schematic structure diagram of a sensing service processing apparatus according to an embodiment of this application. As shown in FIG. 14, the sensing service processing apparatus 1400 includes:

a second receiving unit 1401, configured to receive a third sensing service request message transmitted by a first network element; and a third selection unit 1402, configured to select a target sensing device according to the third sensing service request message.

The third sensing service request message includes at least one of the following:

second sensing service description information;

information of a first area; or identification information of a candidate sensing device in the first area.

Optionally, the second sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

Optionally, the third selection unit is configured to:

select the target sensing device according to the information of the first area, where a serving area of the target sensing device includes the entire or partial first area.

Optionally, the third selection unit is configured to:

select a sensing device with a sensing service capability matching a sensing service corresponding to the second sensing service description information as the target sensing device based on the identification information of the candidate sensing device in the first area and the second sensing service description information.

Optionally, the apparatus further includes:

a second acquisition unit, configured to acquire service sensing capability information of a sensing device in a network.

Optionally, the service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

Optionally, the apparatus further includes:

a fourth selection unit, configured to reselect the target sensing device according to a change of the information of the first area.

Optionally, the apparatus further includes:

a fifth selection unit, configured to reselect the target sensing device according to a change of the identification information of the candidate sensing device in the first area.

Optionally, the first network element is an access and mobility management function AMF network element. Or, the sensing device includes a sensing terminal device and/or a sensing access network device.

In this embodiment, the sensing control function network element selects a target sensing device according to the third sensing service request message, whereby the sensing control function network element transmits sensing resource configuration information, a sensing measurement task, and sensing measurement control information to the target sensing device subsequently, thereby ensuring the smooth progress of a sensing service process.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiment shown in FIG. 5, and achieve the same technical effect. The details are omitted herein to avoid repetition.

Figure 15:
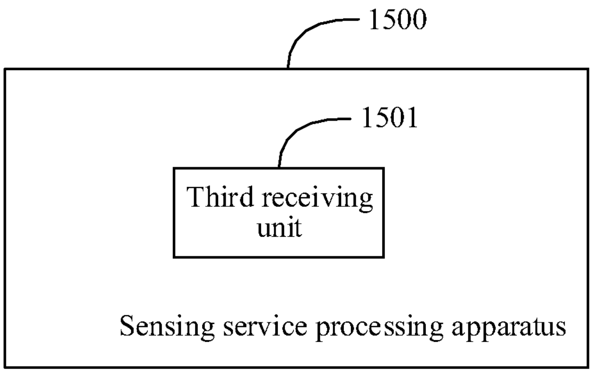
FIG. 15 is a third schematic structure diagram of a sensing service processing apparatus according to an embodiment of this application.

FIG. 15 is a third schematic structure diagram of a sensing service processing apparatus according to an embodiment of this application. As shown in FIG. 15, the sensing service processing apparatus 1500 includes:

a third receiving unit 1501, configured to receive a second sensing service request message.

The second sensing service request message includes: second sensing service description information and identification information of a target sensing device.

Optionally, the second sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

In this embodiment, the sensing control function network element obtains a target sensing device selected by the first network element according to a sensing service processing message transmitted by the first network element, whereby sensing resource configuration information, a sensing measurement task, and sensing measurement control information are transmitted to the target sensing device subsequently, thereby ensuring the smooth progress of a sensing service process.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiment shown in FIG. 6, and achieve the same technical effect. The details are omitted herein to avoid repetition.

Figure 16:
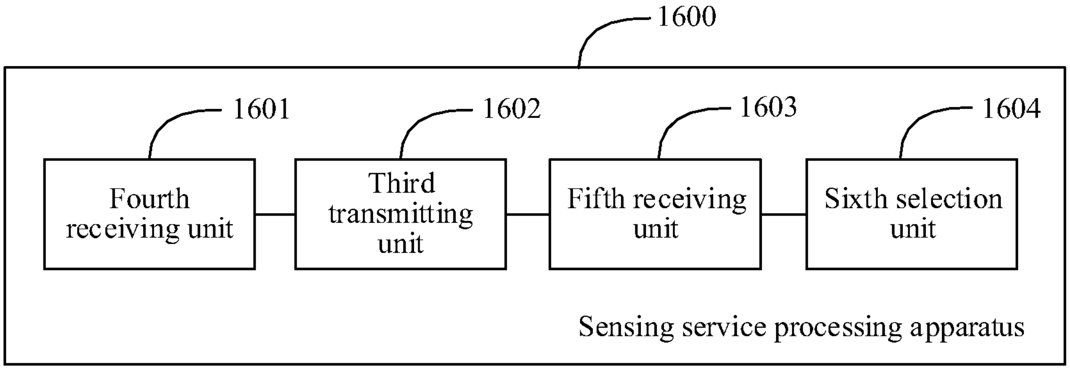
FIG. 16 is a fourth schematic structure diagram of a sensing service processing apparatus according to an embodiment of this application.

FIG. 16 is a fourth schematic structure diagram of a sensing service processing apparatus according to an embodiment of this application. As shown in FIG. 16, the sensing service processing apparatus 1600 includes:

a fourth receiving unit 1601, configured to receive a first sensing service request message, where the first sensing service request message is used for requesting for performing sensing for a service for a first user equipment;

a third transmitting unit 1602, configured to transmit a first request message to a first network element, where the first request message is used for requesting to acquire identification information of a sensing device in a sensing serving area corresponding to the first user equipment;

a fifth receiving unit 1603, configured to receive a first request response message transmitted by the first network element, and acquire identification information of a candidate sensing device in the sensing serving area corresponding to the first user equipment; and a sixth selection unit 1604, configured to select a target sensing device for the sensing service according to the identification information of the candidate sensing device.

In this embodiment, user equipment or AF triggers to transmit a sensing service request message. After receiving the sensing service request message, the sensing control function SCF network element transmits identification information of a sensing device in a sensing serving area corresponding to a first user equipment to the first network element, acquires the identification information of the sensing device in the sensing serving area corresponding to the first user equipment returned by the first network element, and selects a target sensing device for the sensing service according to the identification information, whereby the sensing control function SCF network element transmits sensing resource configuration information, a sensing measurement task, and sensing measurement control information to the target sensing device subsequently, thereby ensuring the smooth progress of a sensing service process.

Optionally, the apparatus further includes:

a third acquisition unit, configured to acquire service sensing capability information of a sensing device in a network.

Optionally, the sixth selection unit is configured to:

select a sensing device with a sensing service capability matching the sensing service in the candidate sensing device as the target sensing device according to the service sensing capability information of the sensing device in the network.

Optionally, the service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

Optionally, the first request message includes: identification information of the first user equipment and third sensing serving area information.

The third sensing serving area information includes absolute location range information or relative location range information corresponding to the first user equipment.

Optionally, the first sensing service request message includes: identification information of the first user equipment and first sensing service description information.

The first sensing service description information includes at least one of the following:

sensing service type information;

sensing object information;

sensing measurement type information;

sensing service purpose or application information;

sensing service granularity information;

sensing service time information;

sensing data reporting information; or quality of service requirement information of sensing service.

Optionally, the first network element includes an access and mobility management function AMF network element. Or, the sensing device includes a sensing terminal device and/or a sensing access network device.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiment shown in FIG. 9, and achieve the same technical effect. The details are omitted herein to avoid repetition.

Figure 17:
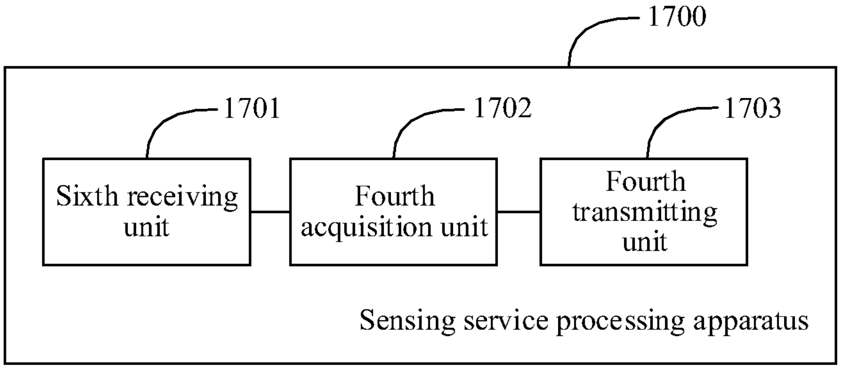
FIG. 17 is a fifth schematic structure diagram of a sensing service processing apparatus according to an embodiment of this application.

FIG. 17 is a fifth schematic structure diagram of a sensing service processing apparatus according to an embodiment of this application. As shown in FIG. 17, the sensing service processing apparatus 1700 includes:

a sixth receiving unit 1701, configured to receive a first request message, where the first request message is used for requesting to acquire identification information of a sensing device in a sensing serving area corresponding to a first user equipment;

a fourth acquisition unit 1702, configured to determine information of a first area according to location information of the first user equipment, and acquire identification information of a candidate sensing device in the first area; and a fourth transmitting unit 1703, configured to transmit a first request response message, where the first request response message carries the identification information of the candidate sensing device in the first area.

In this embodiment, user equipment or AF triggers to transmit a sensing service request message. After receiving the sensing service request message, the sensing control function SCF network element transmits identification information of a sensing device in a sensing serving area corresponding to a first user equipment to the first network element. After receiving the request, the first network element returns the identification information of the sensing device in the sensing serving area corresponding to the first user equipment, whereby the SCF network element selects a target sensing device for the sensing service according to the identification information, and the sensing control function SCF network element transmits sensing resource configuration information, a sensing measurement task, and sensing measurement control information to the target sensing device subsequently, thereby ensuring the smooth progress of a sensing service process.

Optionally, the first request message includes: identification information of the first user equipment and third sensing serving area information.

The third sensing serving area information includes absolute location range information or relative location range information corresponding to the first user equipment.

Optionally, the determining information of a first area according to location information of the first user equipment includes:

determining the information of the first area according to the location information of the first user equipment and the third sensing serving area information.

Optionally, the first network element includes an access and mobility management function AMF network element. Or, the sensing device includes a sensing terminal device and/or a sensing access network device.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiment shown in FIG. 10, and achieve the same technical effect. The details are omitted herein to avoid repetition.

Figure 18:
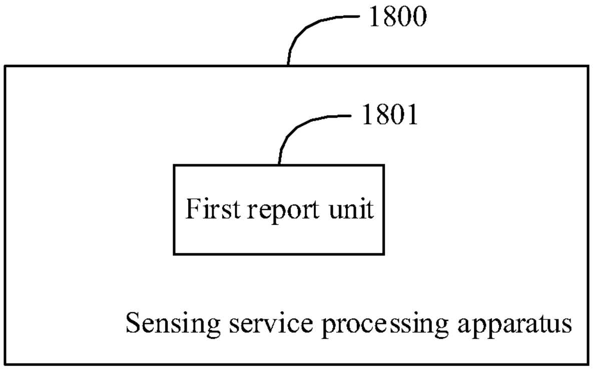
FIG. 18 is a sixth schematic structure diagram of a sensing service processing apparatus according to an embodiment of this application.

FIG. 18 is a sixth schematic structure diagram of a sensing service processing apparatus according to an embodiment of this application. As shown in FIG. 18, the sensing service processing apparatus 1800 includes:

a first report unit 1801, configured to report service sensing capability information to a first network element.

The service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

Optionally, the sensing device includes a sensing terminal device and/or a sensing access network device. Or, the first network element includes an access and mobility management function AMF network element or a sensing control function network element.

Optionally, in a case that the sensing device is the sensing terminal device and the first network element is the access and mobility management function AMF network element, the first report unit is configured to:

report, by the sensing device, the service sensing capability information to the first network element in a case that a first service sensing capability information reporting trigger condition is satisfied.

The first service sensing capability information reporting trigger condition includes:

the sensing device initially enters a serving area of the first network element;

the sensing device performs mobility registration or periodic registration in the serving area of the first network element;

a sensing service capability of the sensing device changes; and the sensing device receives a service sensing capability information acquisition request.

Optionally, in a case that the sensing device is the sensing access network device and the first network element is the access and mobility management function AMF network element, the first report unit is configured to:

report, by the sensing device, the service sensing capability information to the first network element in a case that a second service sensing capability information reporting trigger condition is satisfied.

The second service sensing capability information reporting trigger condition includes:

the sensing device establishes a device-to-device connection with the first network element;

the sensing device establishes a user granularity connection with the first network element;

a sensing service capability of the sensing device changes; and the sensing device receives a service sensing capability information acquisition request.

Optionally, in a case that the sensing device is the sensing terminal device and the first network element is the sensing control function network element, the first report unit is configured to:

report, by the sensing device, the service sensing capability information to the first network element in a case that a third service sensing capability information reporting trigger condition is satisfied.

The third service sensing capability information reporting trigger condition includes:

the sensing device initially enters a serving area of the first network element;

the sensing device establishes a device-to-device connection with the first network element;

the sensing device periodically reports the sensing service capability in the serving area of the first network element;

a sensing service capability of the sensing device changes; and the sensing device receives a service sensing capability information acquisition request.

Optionally, in a case that the sensing device is the sensing access network device and the first network element is the sensing control function network element, the first report unit is configured to:

report, by the sensing device, the service sensing capability information to the first network element in a case that a fourth service sensing capability information reporting trigger condition is satisfied.

The fourth service sensing capability information reporting trigger condition includes:

the sensing device establishes a device-to-device connection with the first network element;

the sensing device establishes a user granularity connection with the first network element;

a sensing service capability of the sensing device changes; and the sensing device receives a service sensing capability information acquisition request.

The sensing service processing apparatus in this embodiment of this application may be an apparatus, an apparatus or electronic device with an operating system, or a component, an integrated circuit or a chip in a core network device.

The sensing service processing apparatus according to this embodiment of this application can implement all processes implemented by the embodiment shown in FIG. 12, and achieve the same technical effect. The details are omitted herein to avoid repetition.

Figure 19:
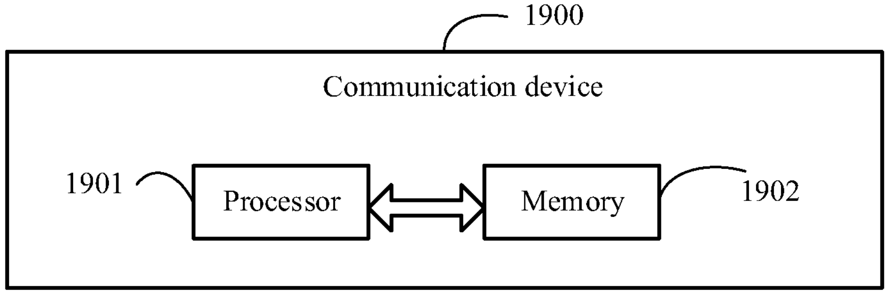
FIG. 19 is a schematic structure diagram of a communication device according to an embodiment of this application.

Optionally, as shown in FIG. 19, embodiments of this application further provide a communication device 1900, including a processor 1901, a memory 1902, and a program or instruction stored in the memory 1902 and executable on the processor 1901. For example, when the communication device 1900 is a terminal, the program or instruction, when executed by the processor 1901, implements various processes of the foregoing embodiments of the sensing service processing method, and can achieve the same technical effect. When the communication device 1900 is a network-side device, the program or instruction, when executed by the processor 1901, implements various processes of the foregoing embodiment of the sensing service processing method, and can achieve the same technical effect. The details are omitted herein to avoid repetition.

Figure 20:
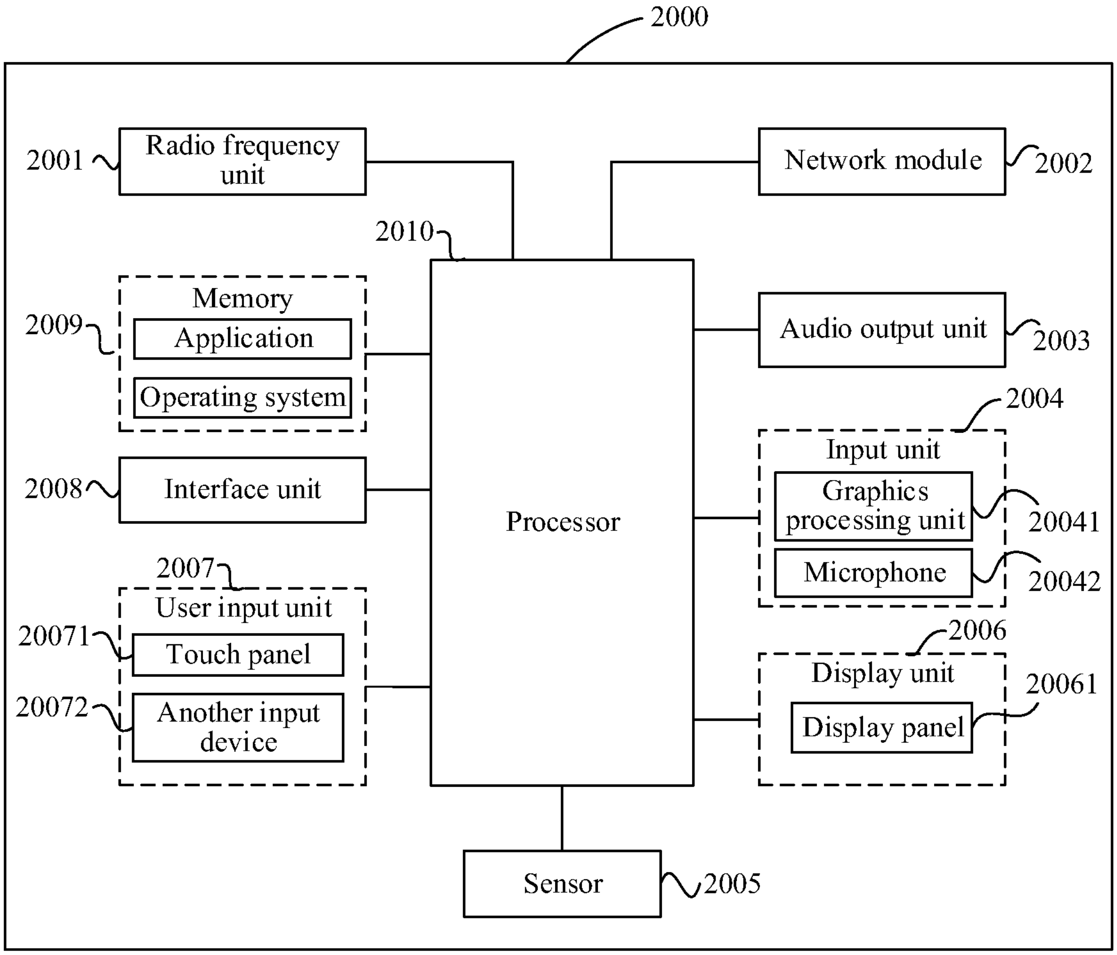
FIG. 20 is a schematic diagram of a hardware structure of a terminal according to an embodiment of this application.

Embodiments of this application further provide a terminal, including a processor and a communication interface. The communication interface is configured to report service sensing capability information to a first network element. The terminal embodiments correspond to the foregoing method embodiments of the sensing terminal device. Various implementation processes and implementation modes of the method embodiments are applicable to the terminal embodiments, and can achieve the same technical effect. For example, FIG. 20 is a schematic diagram of a hardware structure of a terminal according to an embodiment of this application.

The terminal 2000 includes, but is not limited to, at least some components such as a radio frequency unit 2001, a network module 2002, an audio output unit 2003, an input unit 2004, a sensor 2005, a display unit 2006, a user input unit 2007, an interface unit 2008, a memory 2009, and a processor 2010.

It will be appreciated by those skilled in the art that the terminal 2000 may further include a power supply (such as a battery) for supplying power to the components. The power supply may be logically connected to the processor 2010 by a power management system, thereby implementing functions such as charging, discharging, and power consumption management by using the power management system. The terminal structure shown in FIG. 20 does not constitute a limitation on the terminal, and the terminal may include more or fewer components than shown, or combine some components, or have different component arrangements. The details are omitted herein.

It will be understood that in this embodiment of this application, the input unit 2004 may include a graphics processing unit (GPU) 20041 and a microphone 20042. The graphics processing unit 20041 performs processing on image data of a static picture or a video that is obtained by an image capture apparatus (for example, a camera) in a video capture mode or an image capture mode. The display unit 2006 may include a display panel 20061. The display panel 20061 may be configured by using a liquid crystal display, an organic light-emitting diode, or the like. The user input unit 2007 includes a touch panel 20071 and another input device 20072. The touch panel 20071 may also be referred to as a touch screen. The touch panel 20071 may include two parts: a touch detection apparatus and a touch controller. The another input device 20072 may include, but is not limited to, a physical keyboard, a functional key (such as a volume control key or a switch key), a track ball, a mouse, and a joystick. The details are omitted herein.

In this embodiment of this application, the radio frequency unit 2001 receives downlink data from a network-side device and then transmits the downlink data to the processor 2010 for processing. In addition, uplink data is transmitted to the network-side device. Generally, the radio frequency unit 2001 includes, but is not limited to, an antenna, at least one amplifier, a transceiver, a coupler, a low noise amplifier, a duplexer, and the like.

The memory 2009 may be configured to store a software program or instruction and various data. The memory 2009 may mainly include a program or instruction storage area and a data storage area. The program or instruction storage area may store an operating system, an application or instruction required by at least one function (such as a sound playback function and an image display function), and the like. In addition, the memory 2009 may include a high-speed random access memory and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk memory, a flash memory, or another non-volatile solid-state memory.

The processor 2010 may include one or more processing units. Optionally, the processor 2010 may integrate an application processor and a modem processor. The application processor mainly processes an operating system, a user interface, an application or instruction, and the like. The modem processor mainly processes wireless communication such as a baseband processor. It will be understood that the foregoing modem may either not be integrated into the processor 2010.

The radio frequency unit 2001 is configured to report service sensing capability information to a first network element.

The service sensing capability information includes at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

Optionally, the radio frequency unit 2001 is further configured to:

report, by the sensing device, the service sensing capability information to the first network element in a case that a first service sensing capability information reporting trigger condition is satisfied.

The first service sensing capability information reporting trigger condition includes:

the sensing device initially enters a serving area of the first network element;

the sensing device performs mobility registration or periodic registration in the serving area of the first network element;

a sensing service capability of the sensing device changes; and the sensing device receives a service sensing capability information acquisition request.

Optionally, the radio frequency unit 2001 is further configured to:

report, by the sensing device, the service sensing capability information to the first network element in a case that a third service sensing capability information reporting trigger condition is satisfied.

The third service sensing capability information reporting trigger condition includes:

the sensing device initially enters a serving area of the first network element;

the sensing device establishes a device-to-device connection with the first network element;

the sensing device periodically reports the sensing service capability in the serving area of the first network element;

a sensing service capability of the sensing device changes; and the sensing device receives a service sensing capability information acquisition request.

In this embodiment of this application, in a case that a service sensing capability information reporting trigger condition is satisfied, a sensing device reports service sensing capability information to a first network element, whereby the first network element may select the sensing device matching a sensing service according to service sensing capability information, thereby facilitating the smooth progress of a sensing service process.

Embodiments of this application further provide a network-side device, including a processor and a communication interface. The communication interface is configured to receive a first sensing service request message. The first sensing service request message is used for requesting for performing sensing for a service for a first user equipment. The processor is configured to select a target sensing control function network element and/or a target sensing device according to location information of the first user equipment. The network-side device embodiments correspond to the foregoing method embodiments of the first network element. Various implementation processes and implementation modes of the method embodiments are applicable to the network-side device embodiments, and can achieve the same technical effect.

Embodiments of this application further provide a network-side device, including a processor and a communication interface. The communication interface is configured to receive a first request message. The first request message is used for requesting to acquire identification information of a sensing device in a sensing serving area corresponding to a first user equipment. The processor is configured to determine information of a first area according to location information of the first user equipment, and acquire identification information of a candidate sensing device in the first area. The communication interface is further configured to transmit a first request response message. The first request response message carries the identification information of the candidate sensing device in the first area. The network-side device embodiments correspond to the foregoing method embodiments of the first network element. Various implementation processes and implementation modes of the method embodiments are applicable to the network-side device embodiments, and can achieve the same technical effect.

Embodiments of this application further provide a network-side device, including a processor and a communication interface. The communication interface is configured to receive a third sensing service request message transmitted by a first network element. The processor is configured to select a target sensing device according to the third sensing service request message. The third sensing service request message includes at least one of the following: second sensing service description information; information of a first area; or identification information of a candidate sensing device in the first area. The network-side device embodiments correspond to the foregoing method embodiments of the sensing control function network element. Various implementation processes and implementation modes of the method embodiments are applicable to the network-side device embodiments, and can achieve the same technical effect.

Embodiments of this application further provide a network-side device, including a processor and a communication interface. The communication interface is configured to receive a second sensing service request message. The second sensing service request message includes: second sensing service description information and identification information of a target sensing device. The network-side device embodiments correspond to the foregoing method embodiments of the sensing control function network element. Various implementation processes and implementation modes of the method embodiments are applicable to the network-side device embodiments, and can achieve the same technical effect.

Embodiments of this application further provide a network-side device, including a processor and a communication interface. The communication interface is configured to receive a first sensing service request message. The first sensing service request message is used for requesting for performing sensing for a service for a first user equipment. The communication interface is further configured to transmit a first request message to a first network element. The first request message is used for requesting to acquire identification information of a sensing device in a sensing serving area corresponding to the first user equipment. The communication interface is further configured to receive a first request response message transmitted by the first network clement, and acquire identification information of a candidate sensing device in the sensing serving area corresponding to the first user equipment. The processor is configured to select a target sensing device for the sensing service according to the identification information of the candidate sensing device. The network-side device embodiments correspond to the foregoing method embodiments of the sensing control function network element. Various implementation processes and implementation modes of the method embodiments are applicable to the network-side device embodiments, and can achieve the same technical effect.

Figure 21:
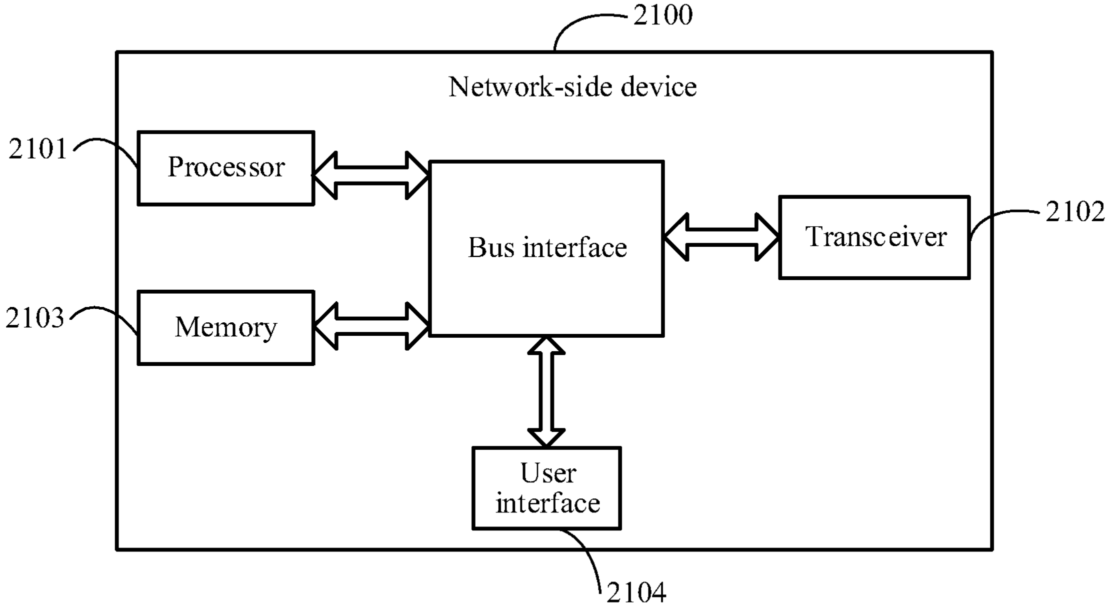
FIG. 21 is a first schematic structure diagram of a network-side device according to an embodiment of this application.

For example, embodiments of this application further provide a network-side device. As shown in FIG. 21, the network-side device 2100 includes: a processor 2101, a transceiver 2102, a memory 2103, a user interface 2104, and a bus interface.

In this embodiment of the present application, the network-side device 2100 further includes: a computer program stored in the memory 2103 and executable on the processor 2101. The computer program, when executed by the processor 2101, implements the method performed by each module shown in FIG. 13 to FIG. 17 to achieve the same technical effect. The details are omitted herein to avoid repetition.

In FIG. 21, a bus architecture may include any quantity of interconnected buses and bridges, and connects together circuits that are of one or more processors represented by the processor 2101 and of a memory represented by the memory 2103. The bus architecture may further connect various other circuits of a peripheral, a voltage regulator, a power management circuit, and the like. This is well known in the art, and therefore, no further description is provided in this specification. The bus interface provides an interface. The transceiver 2102 may be a plurality of components, including a transmitter and a receiver, and providing units for communicating with various other apparatuses on a transmission medium. For different user equipments, the user interface 2104 may be an interface capable of externally or internally connecting a required device. The connected device includes, but not limited to, a keypad, a display, a speaker, a microphone, and a joystick.

The processor 2101 is responsible for the management of the bus architecture and normal processing, and the memory 2103 may store data used when the processor 2101 performs an operation.

Embodiments of this application further provide a network-side device, including a processor and a communication interface. The communication interface is configured to report service sensing capability information to a first network element. The network-side device embodiments correspond to the foregoing method embodiments of the sensing access network device. Various implementation processes and implementation modes of the method embodiments are applicable to the network-side device embodiments, and can achieve the same technical effect.

Figure 22:
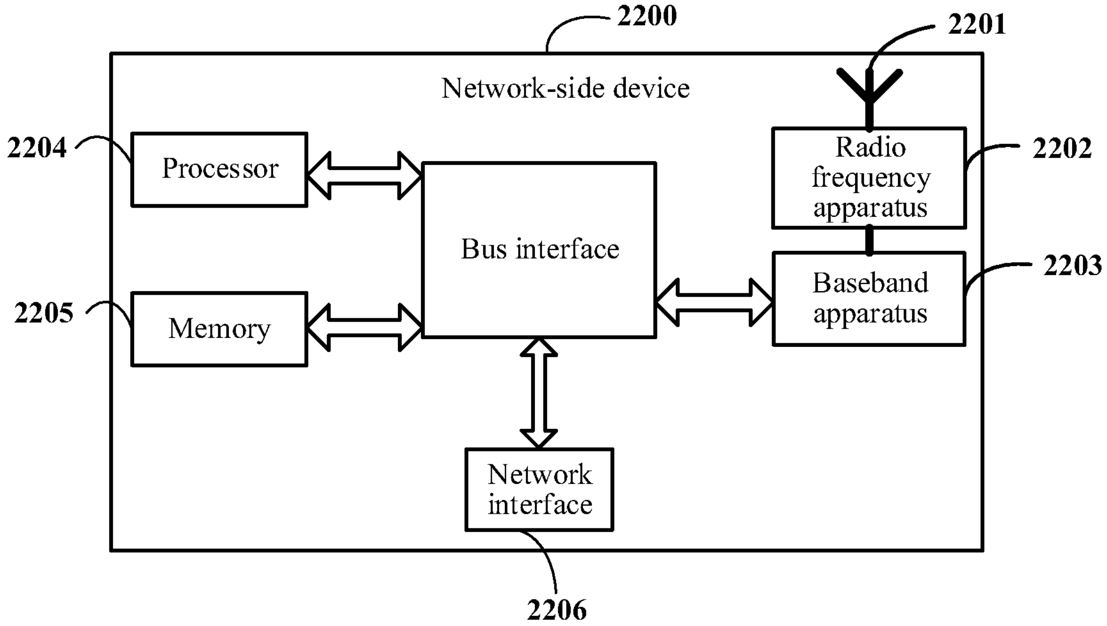
FIG. 22 is a second schematic structure diagram of a network-side device according to an embodiment of this application.

For example, embodiments of this application further provide a network-side device. As shown in FIG. 22, the network-side device 2200 includes: an antenna 2201, a radio frequency apparatus 2202, and a baseband apparatus 2203. The antenna 2201 is connected to the radio frequency apparatus 2202. In an uplink direction, the radio frequency apparatus 2202 receives information through the antenna 2201 and transmits the received information to the baseband apparatus 2203 for processing. In a downlink direction, the baseband apparatus 2203 processes information to be transmitted and transmits the information to the radio frequency apparatus 2202. The radio frequency apparatus 2202 processes the received information and transmits the information through the antenna 2201.

The band processing apparatus may be located in the baseband apparatus 2203, and the method performed by the network-side device in the above embodiments may be implemented in the baseband apparatus 2203. The baseband apparatus 2203 includes a processor 2204 and a memory 2205.

The baseband apparatus 2203 may, for example, include at least one baseband board. The baseband board is provided with a plurality of chips. As shown in FIG. 22, one of the chips is, for example, a processor 2204, connected to the memory 2205 to invoke programs in the memory 2205 to perform a network device operation shown in the above method embodiments.

The baseband apparatus 2203 may further include a network interface 2206 for exchanging information with the radio frequency apparatus 2202. The interface is, for example, a common public radio interface (common public radio interface, CPRI).

For example, the network-side device in this embodiment of the present application further includes: an instruction or program stored in the memory 2205 and executable on the processor 2204. The processor 2204 invokes the instruction or program in the memory 2205 to implement the method performed by each module shown in FIG. 18 to achieve the same technical effect. The details are omitted herein to avoid repetition.

Embodiments of this application further provide a non-transitory readable storage medium. The non-transitory readable storage medium stores a program or instruction. The program or instruction, when executed by a processor, implements various processes of the foregoing embodiment of the sensing service processing method, and can achieve the same technical effect. The details are omitted herein to avoid repetition.

The processor is a processor in the terminal described in the foregoing embodiments. The non-transitory readable storage medium includes a non-transitory computer-readable storage medium, such as a computer read-only memory (Read-Only Memory, ROM), a random access memory (Random Access Memory, RAM), a magnetic disk or an optical disk, etc.

Embodiments of this application additionally provide a chip. The chip includes a processor and a communication interface. The communication interface is coupled to the processor. The processor is configured to execute a program or instruction, which implements various processes of the foregoing embodiment of the sensing service processing method and can achieve the same technical effect. The details are omitted herein to avoid repetition.

It should be understood that the chip referred to in this embodiment of this application may also be referred to as a system-on-chip, a system. chip, a chip system, a system-on-a-chip, or the like.

It should be noted that the terms “include”, “comprise”, or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence “including one” does not exclude that there are still other same elements in the processes, methods, objects, or apparatuses. Further, it should be noted that the scope of the method and apparatus in the implementations of this application is not limited to performing functions in the order shown or discussed, but may also include performing functions in a substantially simultaneous manner or in reverse order depending on the functions involved. For example, the described methods may be performed in a different order than described, and various steps may be added, omitted, or combined. In addition, features described with reference to some examples may be combined in other examples.

According to the descriptions in the above implementations, those skilled in the art may clearly learn that the method according to the foregoing embodiment may be implemented by relying on software and a necessary common hardware platform, and may be definitely implemented by hardware. However, in many cases, the former is a preferred implementation. Based on such an understanding, the technical solution of this application, either inherently or in any part contributing to the related art, may be embodied in the form of a computer software product. The computer software product is stored in a non-transitory storage medium (such as a ROM/RAM, a magnetic disk, and an optical disc), and includes a plurality of instructions for enabling a terminal (which may be a mobile phone, a computer, a server, an air conditioner, or a network device) to perform the method according to the various embodiments of this application.

Embodiments of this application have been described above with reference to the accompanying drawings. However, this application is not limited to the specific implementations described above, and the specific implementations described above are merely exemplary and not limitative. Those of ordinary skill in the art may make various variations under the teaching of this application without departing from the spirit of this application and the protection scope of the claims, and such variations all fall within the protection scope of this application.

The invention claimed is:

1. A sensing service processing method, comprising:

receiving, by a first network element, a first sensing service request message, wherein the first sensing service request message is used for requesting for performing sensing for a service for a first user equipment; and selecting, by the first network element, a target sensing device according to location information of the first user equipment; and the method further comprises:

reselecting, by the first network element, the target sensing device according to an update of the location information of the first user equipment; wherein the first network element is a sensing control function network element.

2. The sensing service processing method according to claim 1, wherein the first sensing service request message comprises identification information of the first user equipment and first sensing service description information, wherein the first sensing service description information comprises at least one of the following:

sensing service type information;

sensing object information;

sensing measurement type information;

sensing service purpose or application information;

sensing service granularity information;

sensing service time information;

sensing data reporting information; or quality of service requirement information of sensing service.

3. The sensing service processing method according to claim 2, wherein the first sensing service request message further comprises: first sensing serving area information, wherein the first sensing serving area information comprises absolute location range information or relative location range information corresponding to the first user equipment.

4. The sensing service processing method according to claim 1, wherein the selecting, by the first network element, the target sensing device according to location information of the first user equipment comprises:

determining, by the first network element, information of a first area according to the location information of the first user equipment and second sensing serving area information; and selecting, by the first network element, the target sensing device according to the information of the first area, wherein a serving area of the target sensing device comprises the entire or partial first area.

5. The sensing service processing method according to claim 4, wherein the selecting, by the first network element, the target sensing device according to the information of the first area comprises:

querying, by the first network element, the target sensing device from a network repository function network element according to the information of the first area.

6. The sensing service processing method according to claim 4, wherein the method further comprises:

acquiring, by the first network element, service sensing capability information of a sensing control function network element and/or a sensing device in a network;

wherein the selecting, by the first network element, the target sensing device according to the information of the first area comprises:

selecting, by the first network element, a sensing device with a sensing service capability matching the sensing service in the first area as the target sensing device according to the service sensing capability information of the sensing device in the network and the first sensing service description information.

7. The sensing service processing method according to claim 2, wherein the method further comprises:

transmitting, by the first network element, a second sensing service request message to a target sensing control function network element in a case that the first network element selects the target sensing device, wherein the second sensing service request message comprises: second sensing service description information and identification information of the target sensing device, wherein the second sensing service description information is generated according to the first sensing service description information.

8. The sensing service processing method according to claim 4, wherein the method further comprises:

transmitting, by the first network element, a third sensing service request message to the target sensing control function network element in a case that the first network element does not select the target sensing device, wherein the third sensing service request message comprises at least one of the following:

second sensing service description information;

the information of the first area; or identification information of a candidate sensing device in the first area, wherein the second sensing service description information is generated according to the first sensing service description information.

9. A sensing service processing method, comprising:

receiving, by a sensing control function network element, a third sensing service request message transmitted by a first network element; and selecting, by the sensing control function network element, a target sensing device according to the third sensing service request message, wherein the third sensing service request message comprises at least one of the following:

information of a first area, wherein the information of the first area is determined according to the location information of the first user equipment and second sensing serving area information; or identification information of a candidate sensing device in the first area; wherein the first network element is an access and mobility management function.

10. The sensing service processing method according to claim 9, wherein the selecting, by the sensing control function network element, a target sensing device according to the third sensing service request message comprises:

selecting, by the sensing control function network element, the target sensing device according to the information of the first area, wherein a serving area of the target sensing device comprises the entire or partial first area;

wherein the method further comprises:

reselecting, by the sensing control function network element, the target sensing device according to a change of the information of the first area.

11. The sensing service processing method according to claim 9, wherein the selecting, by the sensing control function network element, a target sensing device according to the third sensing service request message comprises:

selecting, by the sensing control function network element, a sensing device with a sensing service capability matching a sensing service corresponding to the second sensing service description information as the target sensing device based on the identification information of the candidate sensing device in the first area and the second sensing service description information.

12. The sensing service processing method according to claim 11, wherein the method further comprises:

acquiring, by the sensing control function network element, service sensing capability information of a sensing device in a network;

wherein the service sensing capability information comprises at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

13. The sensing service processing method according to claim 11, wherein the method further comprises:

reselecting, by the sensing control function network element, the target sensing device according to a change of the identification information of the candidate sensing device in the first area.

14. A sensing service processing method, comprising:

receiving, by a sensing control function network element, a first sensing service request message, wherein the first sensing service request message is used for requesting for performing sensing for a service for a first user equipment;

transmitting, by the sensing control function network element, a first request message to a first network element, wherein the first request message is used for requesting to acquire identification information of a sensing device in a sensing serving area corresponding to the first user equipment;

receiving, by the sensing control function network element, a first request response message transmitted by the first network element, and acquiring identification information of a candidate sensing device in the sensing serving area corresponding to the first user equipment; and selecting, by the sensing control function network element, a target sensing device for the sensing service according to the identification information of the candidate sensing device; wherein the first network element is an access and mobility management function.

15. The sensing service processing method according to claim 14, wherein the method further comprises:

acquiring, by the sensing control function network element, service sensing capability information of a sensing device in a network;

wherein the selecting, by the sensing control function network element, a target sensing device for the sensing service according to the identification information of the candidate sensing device comprises:

selecting, by the sensing control function network element, a sensing device with a sensing service capability matching the sensing service in the candidate sensing device as the target sensing device according to the service sensing capability information of the sensing device in the network.

16. The sensing service processing method according to claim 15, wherein the service sensing capability information comprises at least one of the following:

information indicating whether sensing service is supported or not;

supported sensing service type information;

supported sensing object information;

supported sensing measurement range information;

supported sensing measurement type information;

supported quality of service QoS information of sensing service;

supported sensing measurement service purpose or application information;

supported sensing measurement time information; or supported sensing data reporting information.

17. The sensing service processing method according to claim 14, wherein the first request message comprises: identification information of the first user equipment and third sensing serving area information, wherein the third sensing serving area information comprises absolute location range information or relative location range information corresponding to the first user equipment.

18. The sensing service processing method according to claim 14, wherein the first sensing service request message comprises: identification information of the first user equipment and first sensing service description information, wherein the first sensing service description information comprises at least one of the following:

sensing service type information;

sensing object information;

sensing measurement type information;

sensing service purpose or application information;

sensing service granularity information;

sensing service time information;

sensing data reporting information; or quality of service requirement information of sensing service.

* * * * *